(12) United States Patent
Rappaport et al.

(10) Patent No.: US 7,055,107 B1
(45) Date of Patent: May 30, 2006

(54) METHOD AND SYSTEM FOR AUTOMATED SELECTION OF OPTIMAL COMMUNICATION NETWORK EQUIPMENT MODEL, POSITION, AND CONFIGURATION

(75) Inventors: Theodore Rappaport, Salem, VA (US); Roger Skidmore, Blacksburg, VA (US); Praveen Sheethalnath, Blacksburg, VA (US)

(73) Assignee: Wireless Valley Communications, Inc., Austin, TX (US)

( * ) Notice: Subject to any disclaimer, the term of this patent is extended or adjusted under 35 U.S.C. 154(b) by 865 days.

(21) Appl. No.: 09/667,689

(22) Filed: Sep. 22, 2000

(51) Int. Cl.
G09G 5/00 (2006.01)

(52) U.S. Cl. .................. 715/848; 715/734; 715/964; 703/1

(58) Field of Classification Search ............ 345/848, 345/853, 734, 738; 455/466; 703/1; 715/848, 715/734, 964
See application file for complete search history.

(56) References Cited

U.S. PATENT DOCUMENTS

| | | | |
|---|---|---|---|
| 4,675,147 A | 6/1987 | Schaefer et al. | |
| 4,736,453 A | 4/1988 | Schloemer | |
| 4,885,694 A | 12/1989 | Pray et al. | |
| 5,111,392 A | 5/1992 | Malin | |
| 5,119,307 A | 6/1992 | Blaha et al. | |
| 5,239,487 A | 8/1993 | Horejsi et al. | |
| 5,293,640 A | 3/1994 | Gunmar et al. | |
| 5,307,261 A | 4/1994 | Maki et al. | |
| 5,337,149 A | 8/1994 | Kozah et al. | |
| 5,339,184 A | 8/1994 | Tang | |
| 5,375,123 A | 12/1994 | Andersson et al. | |
| 5,394,522 A | 2/1995 | Sanchez-Frank et al. | |
| 5,450,615 A | 9/1995 | Fortune et al. | |
| 5,458,123 A | 10/1995 | Unger | |
| 5,465,390 A | 11/1995 | Cohen | |
| 5,467,441 A | 11/1995 | Stone et al. | |
| 5,482,050 A | 1/1996 | Smokoff et al. | |
| 5,485,568 A | 1/1996 | Venable et al. | |
| 5,491,644 A | 2/1996 | Pickering et al. | |
| 5,491,837 A | 2/1996 | Haartsen | |
| 5,493,679 A | 2/1996 | Virgil et al. | |
| 5,515,269 A | 5/1996 | Willis et al. | |
| 5,528,518 A | 6/1996 | Bradshaw et al. | |
| 5,539,665 A | 7/1996 | Lamming et al. | |
| 5,553,312 A | 9/1996 | Gattey et al. | |
| 5,553,620 A | 9/1996 | Snider et al. | |

(Continued)

OTHER PUBLICATIONS

From Bird's Eye Real-time Mapping Software dated Jun. 30, 2002.

(Continued)

*Primary Examiner*—Cao (Kevin) Nguyen
*Assistant Examiner*—Ting Zhou
(74) *Attorney, Agent, or Firm*—Whitham, Curtis & Christofferson, P.C.

(57) ABSTRACT

A method for engineering management and planning for the design of a communications network in three dimensions (3-D) combines computerized organization, database fusion, and site-specific communication system performance prediction models. The method enables a designer to keep track of communication system performance through the process of pre-bid, design, installation and maintenance of a communication system. Automated selection, placement and configuration of communication component equipment can be performed using desired performance criteria identified at finite locations within the environment along with a finite set of communication component models and suitable locations and configurations in the environment.

44 Claims, 15 Drawing Sheets

U.S. PATENT DOCUMENTS

| | | |
|---|---|---|
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo |
| 5,594,946 A | 1/1997 | Menich et al. |
| 5,598,532 A | 1/1997 | Liron |
| 5,625,827 A | 4/1997 | Krause et al. |
| 5,636,344 A | 6/1997 | Lewis |
| 5,689,355 A | 11/1997 | Okubo et al. |
| 5,710,758 A | 1/1998 | Soliman et al. |
| 5,755,072 A | 5/1998 | Lingafelter |
| 5,761,093 A | 6/1998 | Urbish et al. |
| 5,774,669 A | 6/1998 | George et al. |
| 5,794,128 A | 8/1998 | Brockel et al. |
| 5,799,154 A | 8/1998 | Kuriyan |
| 5,802,146 A | 9/1998 | Dulman |
| 5,809,282 A | 9/1998 | Cooper et al. |
| 5,815,395 A | 9/1998 | Hart et al. |
| 5,821,937 A * | 10/1998 | Tonelli et al. ............... 345/853 |
| 5,825,759 A | 10/1998 | Liu |
| 5,828,960 A | 10/1998 | Tang et al. |
| 5,831,610 A | 11/1998 | Tonelli et al. |
| 5,832,389 A | 11/1998 | Dent |
| 5,845,124 A | 12/1998 | Berman |
| 5,861,887 A | 1/1999 | Butler et al. |
| 5,867,112 A | 2/1999 | Kost |
| 5,877,777 A | 3/1999 | Colwell |
| 5,878,328 A | 3/1999 | Chawla et al. |
| 5,907,850 A | 5/1999 | Krause et al. |
| 5,917,808 A | 6/1999 | Kosbab |
| 5,923,850 A | 7/1999 | Barroux |
| 5,926,762 A | 7/1999 | Arpee et al. |
| 5,940,196 A | 8/1999 | Piehler et al. |
| 5,945,976 A | 8/1999 | Iwamura et al. |
| 5,948,055 A | 9/1999 | Pulsipher et al. |
| 5,949,335 A | 9/1999 | Maynard |
| 5,949,988 A | 9/1999 | Feisullin et al. |
| 5,953,669 A | 9/1999 | Stratis et al. |
| 5,956,028 A * | 9/1999 | Matsui et al. ............... 345/757 |
| 5,963,867 A | 10/1999 | Reynolds et al. |
| 5,970,406 A | 10/1999 | Komara |
| 5,977,851 A | 11/1999 | Stancil et al. |
| 5,984,511 A * | 11/1999 | Vasey-Glandon et al. ...... 703/6 |
| 5,987,328 A | 11/1999 | Ephremides et al. |
| 5,994,984 A | 11/1999 | Stancil et al. |
| 6,006,021 A | 12/1999 | Tognazzini |
| 6,018,625 A | 1/2000 | Hayball et al. |
| 6,021,316 A | 2/2000 | Heiska et al. |
| 6,032,105 A | 2/2000 | Lee et al. |
| 6,038,547 A | 3/2000 | Casto |
| 6,044,273 A | 3/2000 | Tekinay |
| 6,058,102 A | 5/2000 | Drysdale et al. |
| 6,058,262 A | 5/2000 | Kawas et al. |
| 6,059,842 A | 5/2000 | Dumarot et al. |
| 6,061,722 A | 5/2000 | Lipa et al. |
| 6,075,541 A | 6/2000 | Maclinovsky |
| 6,085,335 A | 7/2000 | Djoko et al. |
| 6,088,522 A | 7/2000 | Lee et al. |
| 6,104,699 A | 8/2000 | Holender et al. |
| 6,108,309 A | 8/2000 | Cohoe et al. |
| 6,111,857 A | 8/2000 | Soliman et al. |
| 6,122,083 A | 9/2000 | Ohta et al. |
| 6,148,010 A | 11/2000 | Sutton et al. |
| 6,199,032 B1 | 3/2001 | Anderson |
| 6,204,813 B1 | 3/2001 | Wadell et al. |
| 6,208,833 B1 | 3/2001 | Preschutti et al. |
| 6,229,540 B1 | 5/2001 | Tonelli et al. |
| 6,243,772 B1 | 6/2001 | Ghori et al. |
| 6,253,086 B1 | 6/2001 | Parantainen et al. |
| 6,285,377 B1 | 9/2001 | Greenbaum et al. |
| 6,289,203 B1 | 9/2001 | Smith et al. |
| 6,311,144 B1 | 10/2001 | Abu El Ata |
| 6,317,599 B1 | 11/2001 | Rappaport et al. |
| 6,326,987 B1 | 12/2001 | Alexander |
| 6,330,005 B1 | 12/2001 | Tonelli et al. |
| 6,337,688 B1 | 1/2002 | Berstis |
| 6,338,031 B1 | 1/2002 | Lee et al. |
| 6,356,758 B1 | 3/2002 | Almeida et al. |
| 6,393,432 B1 | 5/2002 | Flansburg et al. |
| 6,408,312 B1 | 6/2002 | Forthman et al. |
| 6,442,507 B1 | 8/2002 | Skidmore et al. |
| 6,459,435 B1 * | 10/2002 | Eichel ..................... 345/588 |
| 6,470,195 B1 | 10/2002 | Meyer |
| 6,487,417 B1 | 11/2002 | Rossoni et al. |
| 6,493,679 B1 | 12/2002 | Rappaport et al. |
| 6,496,290 B1 | 12/2002 | Lee |
| 6,499,006 B1 | 12/2002 | Rappaport et al. |
| 6,505,045 B1 | 1/2003 | Hills et al. |

OTHER PUBLICATIONS

IEEE Transactions on Antennas and propagation, vol. 46, No. 8, Aug. 1998. "Effect oF Terrrain on Path Loss in Urban Environments for Wireless Applications" Leonard Piazzi and Henry L. Bertoni.

P. Bahl, V. Padmanabhan, and A. Balachandran, "A Software System for Locating Mobile Users: Design, Evaluation, and Lessons," Microsoft Technical Report, Apr. 2000.

G. Durgin, T.S. Rappaport, H. Xu, Measurements and Models for Radio Path Loss and Penetration Loss in and Around Homes and Trees at 5.85 GHz, IEEE Transactions on Communications, vol. 46, No. 11, Nov. 1998.

C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.

S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.

T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-14, Virginia Tech, Sep. 1995.

R.K. Morrow, Jr. and T.S. Rappaport, "Getting In," Wireless Review Magazine, Mar. 2000.

Wireless Valley Communications, Inc., "SitePlanner 3.16 for Windows 95/98/NT User's Manual," Software User's Manual. pp. 5-148 to 5-156, 1999.

M. Panjwani et al., "Interactive Computation of Coverage Regions for Wireless Communication in Multifloored Indoor Environments," IEEE Journal of Selected Areas in Communications, vol. 14, No. 3, Apr. 1996.

L. Piazzi and H.L. Bertoni, "Achievable Acurracy of Site-Specific Path-Loss Predictions in Residential Environments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T.S. Rappaport et al., "Radio Propagation Prediction Techniques and Computer-Aided Channeling Modeling for Embedded Wireless Microsystems," ARPA Annual Report, MPRG Technical Report MPRG-TR-94-12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG-TR-95-14, Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S.. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T.S. Rappaport et al., "Indoor Path Loss Measurement for Home and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In-Building Wireless Systems," Infocast In-Building Wireless Solutions Conference and Exposition, Feb. 4, 2003.

S. Sandhu, M.P. Koushik, and T.S. Rappaport "Predicted Path Loss for Roslyn VA, First set of predictions for ORD Project on Site Specific Propagation Prediction," MPRG Technical Report MPRG-TR-94-20, Virginia Tech, Dec. 1994.

S. Sandhu, M.P. Koushik, and T.S. Rappaport, "Predicted Path Loss for Roslyn VA, First set of predictions for ORD Project on Site Specific Propagation Prediction," MPRG Technical Report MPRG-TR-94-20, Virginia Tech, Mar. 1995.

S. Seidel et al., "Site-Specific Propagation Prediction for Wireless In-Building Personal Communication Design," IEEE Transactions on Vehicular Technology, vol. 43, No. 4, Nov. 1994.

S. Shakkottai and T.S. Rappaport, "Research Challenges in Wireless Networks: A Technical Overview," Proceeding of the Fifth International Symposium on Wireles Personal Multimedia Communications, Honolulu, HI, Oct. 2002.

H. Sherali et al., "On the Optimal Location of Transmitters for Micro-cellular Radio Communication System Design," IEEE Journal on Selected Areas in Communications, vol. vol. 14, No. 3, pp. 662-673, May 1996.

R, Skidmore et al., "A Comprehensive In-Building and Microcellular Wireless Communication System Design Tool" The Bradley Department of Electrical Engineering, MPRG-TR-97-13, Jun. 1997. Master's Thesis—unpublished by Virginia Tech for 2 years after submission.

R. Skidmore, et al., Russell Senate Office Building Propagation Study, Project Report for Joseph R. Loring & Associates; "Project Update," AoC Contract# Acbr96088, prepared for Office of the Architect of the Capital, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Torres et al., "CINDOOR: An Engineering Tool for Planning and Design of Wireless Systems in Enclosed Spaces," IEEE Antennas and Propagation Magazine, vol. 41, No. 4, Aug. 1999.

R. Skidmore et al., "Interactive Coverage Region and System Design Simulation for Wireless Communication Systems in Multi-Floored Indoor Environments: SMT Plus tm," IEEE ICUPC Proceedings, 1996.

T.S. Rappaport et al., "Radio Propagation Prediction Techniques and Computer-Aided CHannel Modeling for Embedded Wireless Microsystems," MPRG Tech. Report MPRG-TR-95-08, Virginia Tech, Jul. 1995.

Company Web Page "Actix" www.actix.com product name: E-NOS (now E-AMS).

Company Web Page Agilent www.agilent.com product name: OPAS32.

Company Web Page "Agilent" www.agilent.com product name: Wizard.

Company Web Page "Comarco" www.edx.com product name: SignalPro.

Company Web Page "ComOpt" www.comopt.com. product name: CellOpt AFP.

Company Web Page "Lucent" www.bell-labs.com product name: WiSE.

Company Web Page "Ericsson" www.ericsson.com product name: TEMS Lite.

Company Web Page "Ericsson" www.ericsson.com product name: TEMS.

Company Web Page "Maconi" www.marconi.com product name: PlaNET.

Company Web Page "Marconi" www.marconi.com product name: decibelPlanner.

Company Web Page "Schema" www.schema.com product name: Optimizer.

Company Web Page "ScoreBoard" www.scoreboard.com product name: ScoreBoard.

Software by Andrew titled "RF Planner" dated Jun. 17, 1997.

A user guide titled: "Andrew Microwave System Planner" dated Jul. 1999.

A user guide titled: "Andrew Antenna System Planner" dated Jun. 1999.

Article "Building Database Manipulator" Copyright, Jan. 1998; MPRG and Virginia Tech.

PCS 97 Track 7; Engineering & Systems Management; T. Rappaport.

Propagator; vol. 8, No. 3; Fall 1997.

SMT Plus 1.0 User's Manual; R. Skidmore & T. Rappaport; Copyright, Aug. 1996; Virginia Tech.

1. XP 000620036 Rajkumar et al. "Predicting RF coverage in large environments using ray-beam tracing and partitioning tree represented geometry" Wireless Networks, vol. 2 No. 2, pp. 143-154; Jun. 1, 1996. 2. Xp010198501 Skidmore et al. "Interactive coverage region and system design simulation for wireless communication systems in multifloored indoor environments" vol. 2 No. 29, pp. 646-650 Sep. 29, 1996.

European Search Report dated Dec. 23, 2005.

* cited by examiner

METHOD AND SYSTEM FOR AUTOMATED SELECTION OF OPTIMAL COMMUNICATION NETWORK EQUIPMENT MODEL, POSITION, AND CONFIGURATION

CROSS-REFERENCE TO RELATED APPLICATIONS

This application is related to pending application Ser. No. 09/318,842, entitled "Method and System for Managing a Real Time Bill of Materials," filed by T. S. Rappaport and R. R. Skidmore, Ser. No. 09/318,841, entitled "Method And System for a Building Database Manipulator," filed by T. S. Rappaport and R. R. Skidmore, Ser. No. 09/318,840, entitled "Method and System For Automated Optimization of Communication component Position in 3D" filed by T. S. Rappaport and R. R. Skidmore, Ser. No. 09/633,122 entitled "Method and System for Designing or Deploying a Communications Network which Allows Simultaneous Selection of Multiple Components" filed by T. S. Rappaport and R. R. Skidmore, Ser. No. 09/633,121, entitled "Method and System for Designing or Deploying a Communications Network which Considers Frequency Dependent Effects" filed by T. S. Rappaport and R. R. Skidmore, Ser. No. 09/632,853, entitled "Method and System for Designing or Deploying a Communications Network which Considers Component Attributes" filed by T. S. Rappaport, R. R. Skidmore, and Eric Reifsnider, Ser. No. 09/633,120, entitled "Improved Method and System for a Building Database Manipulator" filed by T. S. Rappaport and R. R. Skidmore, and Ser. No. 09/632,803 entitled "System and Method for Efficiently Visualizing and Comparing Communication Network System Performance" filed by T. S. Rappaport, R. R. Skidmore, and Brian Gold.

BACKGROUND OF THE INVENTION

1. Field of the Invention

The present invention generally relates to engineering and management systems for the design of communications networks and, more particularly, to a method for optimizing the types of, locations for, and configurations of communication hardware components in communication systems in any environment in the world (e.g. buildings, campuses, floors within a building, within cities, or in an outdoor setting, etc.) using a three-dimensional (3-D) representation of the environment and utilizing selected areas within the environment referenced herein as to ensure critical communication system performance is maintained.

2. Background Description

The importance of communication network performance has quickly become an important design issue for engineers who must design and deploy communication system equipment, telephone systems, cellular telephone systems, paging systems, or new wireless communication systems and technologies such as personal communication networks or wireless local area networks. For wireless communication systems, designers are frequently requested to determine if a radio transceiver location, or base station cell site can provide reliable service throughout an entire city, an office, building, arena or campus. A common problem for wireless systems is inadequate coverage, or a "dead zone," in a specific location, such as a conference room, subway tunnel, or alleyway. It is now understood that an indoor wireless PBX (private branch exchange) system or wireless local area network (WLAN) can be rendered useless by interference from nearby, similar systems. The costs of in-building and microcell devices which provide wireless coverage within a 2 kilometer radius are diminishing, and the workload for RF engineers and technicians to install these on-premises systems is increasing sharply. Rapid engineering design and deployment methods for wireless systems are vital for cost-efficient build-out. In similar fashion, the configuration of various components comprising a wired communication network can dramatically impact the overall performance of the remainder of the communication system. The physical location of and configuration of a computer network router relative to other components in a computer network is important to the optimal performance of the network as a whole.

For wireless communication systems, analyzing radio signal coverage penetration and interference is of critical importance for a number of reasons. A design engineer must determine if an existing outdoor large-scale wireless system, or macrocell, will provide sufficient coverage throughout a building, or group of buildings (i.e., a campus). Alternatively, wireless engineers must determine whether local area coverage will be adequately supplemented by other existing macrocells, or whether indoor wireless transceivers, or picocells, must be added. The placement of these cells is critical from both a cost and performance standpoint. If an indoor wireless system is being planned that interferes with signals from an outdoor macrocell, the design engineer must predict how much interference can be expected and where it will manifest itself within the building, or group of buildings. Also, providing a wireless system that minimizes equipment infrastructure cost as well as installation cost is of significant economic importance. As in-building and microcell wireless systems proliferate, these issues must be resolved quickly, easily, and inexpensively, in a systematic and repeatable manner.

Several patents related to, and which allow, the present invention are listed below:

U.S. Pat. No. 5,491,644 entitled "Cell Engineering Tool and Methods" filed by L. W. Pickerting et al;

U.S. Pat. No. 5,561,841 entitled "Method and Apparatus for Planning a Cellular Radio Network by Creating a Model on a Digital Map Adding Properties and Optimizing Parameters, Based on Statistical Simulation Results" filed by O. Markus;

U.S. Pat. No. 5,794,128 entitled "Apparatus and Processes for Realistic Simulation of Wireless Information Transport Systems" filed by K. H. Brockel et al;

U.S. Pat. No. 5,949,988 entitled "Prediction System for RF Power Distribution" filed by F. Feisullin et al;

U.S. Pat. No. 5,987,328 entitled "Method and Device for Placement of Transmitters in Wireless Networks" filed by A. Ephremides and D. Stamatelos;

U.S. Pat. No. 5,598,532 entitled "Method and Apparatus for Optimizing Computer Networks" filed by M. Liron; and U.S. Pat. No. 5,953,669 entitled "Method and Apparatus for Predicting Signal Characteristics in a Wireless Communication System" filed by G. Stratis et al.

There are many computer aided design (CAD) products on the market that can be used to design a model of the environment for use in wireless communication system design. SitePlanner from Wireless Valley Communications, Inc., WiSE from Lucent Technology, Inc., SignalPro from EDX, PLAnet by Mobile Systems International, Inc., Wizard by TEC Cellular, and WinProp from AWE are examples of such wireless CAD products. In practice, however, information regarding a pre-existing building or campus is available only in paper format and a database of parameters defining the environment in a manner suitable for radio wave propagation analysis does not readily exist. It has been difficult, if not generally impossible, to gather this disparate information and manipulate the data for the purposes of planning and implementing indoor and outdoor RF wireless communication systems, and each new environment requires tedious manual data formatting in order to run with computer generated wireless prediction models. Recent research efforts by AT&T Laboratories, Brooklyn Polytechnic, Pennsylvania State University, Virginia Tech, and other leading research centers are described in papers and technical reports, including:

S. Kim, B. J. Guarino, Jr., T. M. Willis III, V. Erceg, S. J. Fortune, R. A. Valenzuela, L. W. Thomas, J. Ling, and J. D. Moore, "Radio Propagation Measurements and Prediction Using Three-dimensional Ray Tracing in Urban Environments at 908 MHZ and 1.9 GHz," *IEEE Transactions on Vehicular Technology*, Vol. 48, No. 3, May 1999;

L. Piazzi and H. L. Bertoni, "Achievable Accuracy of Site-Specific Path-Loss Predictions in Residential Environments," *IEEE Transactions on Vehicular Technology*, Vol. 48, No. 3, May 1999;

G. Durgin, T. S. Rappaport, and H. Xu, "Measurements and Models for Radio Path Loss and Penetration Loss In and Around Homes and Trees at 5.85 Ghz," *IEEE Transactions on Communications*, Vol. 46, No. 11, November 1998;

T. S. Rappaport, M. P. Koushik, J. C. Liberti, C. Pendyala, and T. P. Subramanian, *Radio Propagation Prediction Techniques and Computer-Aided Channel Modeling for Embedded Wireless Microsystems*, ARPA Annual Report, MPRG Technical Report MPRG-TR-94-12, Virginia Tech, Blacksburg, Va., July 1995;

H. D. Sherali, C. M. Pendyala, and T. S. Rappaport, "Optimal Location of Transmitters for Micro-Cellular Radio Communication System Design," *IEEE Journal on Selected Areas in Communications*, Vol. 14, No. 4, May 1996;

T. S. Rappaport, M. P. Koushik, C. Carter, and M. Ahmed, *Radio Propagation Prediction Techniques and Computer-Aided Channel Modeling for Embedded Wireless Microsystems*, MPRG Technical Report MPRG-TR-95-08, Virginia Tech, Blacksburg, Va., July 1995;

M. Ahmed, K. Blankenship, C. Carter, P. Koushik, W. Newhall, R. Skidmore, N. Zhang and T. S. Rappaport, *Use of Topographic Maps with Building Information to Determine Communication component Placement for Radio Detection and Tracking in Urban Environments*, MPRG Technical Report MPRG-TR-95-19, Virginia Tech, Blacksburg, Va., November 1995;

R. R. Skidmore and T. S. Rappaport, *A Comprehensive In-Building and Microcellular Wireless Communications System Design Tool*, master's thesis, Virginit Tech, Dept. Electrical and Computer Engineering, Blacksburg, Va., 1997;

T. S. Rappaport, M. P. Koushik, M. Ahmed, C. Carter, B. Newhall, and N. Zhang, *Use of Topographic Maps with Building Information to Determine Communication component Placements and GPS Satellite Coverage for Radio Detection and Tracking in Urban Environments*, MPRG Technical Report MPRG-TR-95-14, Virginia Tech, Blacksburg, Va., Sep. 15, 1995;

S. Sandhu, P. Koushik, and T. S. Rappaport, *Predicted Path Loss for Rosslyn, Va.*, MPRG Technical Report MPRG-TR-94-20, Virginia Tech, Blacksburg, Va., Dec. 9, 1994;

S. Sandhu, P. Koushik, and T. S. Rappaport, *Predicted Path Loss for Rosslyn, Va., Second set of predictions for ORD Project on Site Specific Propagation Prediction*, MPRG Technical Report MPRG-TR-95-03, Virginia Tech, Blacksburg, Va., Mar. 5, 1995;

W. Rios, A. Tan, and T. S. Rappaport, *SitePlanner Outdoor Simulation Measurements at 1.8 GHz*, MPRG Technical Report, Virginia Tech, Blacksburg, Va., Dec. 18, 1998;

P. M. Koushik, T. S. Rappaport, M. Ahmed, and N. Zhang, "SISP—A Software Tool for Propagation Prediction," Advisory Group for Aerospace Research and Development, Conference Proceedings 574, Athens, Greece, 1995;

T. S. Rappaport and S. Sandhu, "Radio-Wave Propagation for Emerging Wireless Personal Communication Systems, ", *IEEE Antennas and Propagation Magazine*, Vol. 36, No. 5, October 1994;

N. S. Adawi, H. L. Bertoni, J. R. Child, W. A. Daniel, J. E. Dettra, R. P. Eckert, E. H. Flath, R. T. Forrest, W. C. Y. Lee, S. R. McConoughey, J. P. Murray, H. Sachs, G. L. Schrenk, N. H. Shepherd, and F. D. Shipley, "Coverage Prediction for Mobile Radio Systems Operating in the 800/900 MHz Frequency Range," *IEEE Transactions on Vehicular Technology*, Vol. 37, No. 1, February 1988;

M. A. Panjwani and A. L. Abbott, *An Interactive Site Modeling Tool for Estimating Coverage Regions for Wireless Communication Systems in Multifloored Indoor Environments*, master's thesis, Virginia Tech, Dept. Electrical and Computer Engineering, 1995;

S. Y. Seidel and T. S. Rappaport, "Site-Specific Propagation Prediction for Wireless In-Building Personal Communication System Design," *IEEE Transactions on Vehicular Technology*, Vol. 43, No. 4, November 1994; K. L. Blackard, T. S. Rappaport, and C. W. Bostian, "Measurements and Models of Radio Frequency Impulsive Noise for Indoor Wireless Communications," *IEEE Journal on Selected Areas in Communications*, Vol. 11, No. 7, September 1993;

R. A. Brickhouse and T. S. Rappaport, "Urban In-Building Cellular Frequency Reuse," *IEEE Globecom*, London, England, 1996;

S. J. Fortune et al, "WISE Design of Indoor Wireless Systems: Practical Computation and Optimization," *IEEE Computational Science and Engineering*, 1995;

T. S. Rappaport et al, *Use of Topographic Maps with Building Information to Determine Antenna Placement for Radio Detection and Tracking in Urban Environments*, MPRG Technical Report MPRG-TR-96-06, Virginia Tech, Blacksburg, Va., 1995;

K. Feher, *Wireless Digital Communications: Modulation and Spread Spectrum Applications*, Prentice Hall, Upper Saddle River, N.J., 1995; T. S. Rappaport, *Wireless Communications Principles and Practices*, Prentice Hall, Upper Saddle River, N.J., 1996;

R. Hoppe, P. Wertz, G. Wolfle, and F. M. Landstorfer, "Fast and Enhanced Ray Optical Propagation Modeling for Radio Network Planning in Urban and Indoor Scenarios," *Virginia Tech Symposium on Wireless Personal Communications*, Vol. 10, June 2000;

Xylomenos, G., Polyzos., G. C., "TCP and UDP Performance over a Wireless LAN," *Proceedings of IEEE INFOCOM*, 1999;

Maeda, Y., Takaya, K., and Kuwabara, N., "Experimental Investigation of Propagation Characteristics of 2.4 GHz ISM-Band Wireless LAN in Various Indoor Environments," *IEICE Transactions in Communications*, Vol. E82-B, No. 10 Oct. 1999;

Duchamp, D., and Reynolds, N. F., "Measured Performance of a Wireless LAN," *Proceedings of the 17th Conference on Local Computer Networks,* 1992.

Bing, B. "Measured Performance of the IEEE 802.11 Wireless LAN," *Local Computer Networks,* 1999;

Hope, M. and Linge, N., "Determining the Propagation Range of IEEE 802.11 Radio LAN's for Outdoor Applications," *Local Computer Networks,* 1999;

Xylomenos, G. and Polyzos, G. C., "Internet Protocol Performance over Networks with Wireless Links," *IEEE Network,* July/August;

J. Feigin and K. Pahlavan, "Measurement of Characteristics of Voice over IP in a Wireless LAN Environment," *IEEE International Workshop on Mobile Multimedia Communications,* 1999, pp. 236–240;

B. Riggs, "Speed Based on Location," *Information Week,* No. 726, March 1999;

J. Kobielus, G. Somerville, and T. Baylor, "Optimizing In-Building Coverage," *Wireless Review,* Vol. 15, No. 5, pp. 24–30, March 1998;

A. W. Y. Au and V. C. M. Leung, "Modeling and Analysis of Spread Spectrum Signaling with Multiple Receivers for Distributed Wireless In-Building Networks," *IEEE Pacific Rim Conference on Communications, Computers and Signal Processing* 1993, Vol. 2, pp. 694–697;

K. L. Blackard, T. S. Rappaport, and C. W. Bostian, "Radio Frequency Noise Measurements and Models for Indoor Wireless Communications at 918 MHz, 2.44 GHz, and 4.0 GHz," *ICC* 1991, vol. 1, pp. 28–32, 1991; R. R. Skidmore, T. S. Rappaport, and A. L. Abbott, "Interactive Coverage Region and System Design Simulation for Wireless Communication Systems in Multifloored Indoor Environments: SMT Plus," *IEEE International Conference on Universal Personal Communications,* Vol. 2, pp. 646–650, 1996; and M. A. Panjwani, A. L. Abbott, and T. S. Rappaport, "Interactive Computation of Coverage Regions for Wireless Communication in Multifloored Indoor Environments," *IEEE Journal on Selected Areas in Communications,* Vol. 14, No. 3, pp. 420–430, 1996.

These papers and technical reports are illustrative of the state of the art in communication system modeling and show the difficulty in obtaining databases for city environments, such as Rosslyn, Virginia, and are hereby included by reference. While the above papers describe a research comparison of measured vs. predicted signal coverage, the works do not demonstrate a systematic, repeatable and fast methodology for creating an environmental database, nor do they report a method for visualizing and placing various environmental objects that are required to model the performance of a communication system in that environment. Further, none of the cited works provide for an automated method for optimally designing communication systems in three-dimensional space.

While there are methods available for designing communication networks that provide adequate system performance, these known methods involve costly and time consuming predictions of communication system performance that, while beneficial to a designer, require too much time to be applied in a real time manner.

SUMMARY OF THE INVENTION

It is an object of the invention to provide a method of selecting a number of fixed points of specific interest in an environment and identifying a desired communication system performance metric at each point (e.g., −85 dBm received RF signal strength, 18 dB signal-to-interference ratio, 500 kilobits per second throughput, etc.).

It is another object of the invention to provide a method of selecting a number of communication component types from a list of communication components, where the list of communication components may provide information such as specific component manufacturers, part numbers, radiating characteristics, and cost information, and utilizing performance prediction techniques to rank the selected component types in terms of desirability.

It is another object of the invention to provide a method of selecting a number of locations in an environment that are suitable for the placement of communication system components and utilizing performance prediction techniques to rank the locations in terms of desirability.

It is another object of the invention to provide a method for specifying desirable configurations for communication components and utilizing performance prediction techniques to rank the configurations in terms of desirability.

It is another object of the invention to provide a method for automated system performance prediction and optimization of communication system component selection, positioning, and configuration in three-dimensions. By identifying a desired communication system performance metric at a finite number of locations in a three-dimensional environment, a finite set of communication component models, a finite set of suitable locations for placement of communication equipment within the environment, and a finite set of possible configurations for the communication equipment, the invention utilizes performance prediction techniques to rank the desirability of each combination of communication component model, location, and configuration.

According to the present invention, a system is provided for allowing a communication system designer to dynamically model a three dimensional environment of a building, campus, city, or any other physical environment electronically in a manner suitable for the prediction of communication system performance. A system is also provided for allowing a communication system designer to dynamically model a communication system for a building, campus, city or other environment electronically. The method includes the selection and placement of various commercial hardware components, such as antennas (point, omni-directional, leaky feeders, etc.), transceivers, amplifiers, cables, routers, connectors, couplers, splitters, hubs, or any other single or composite communication hardware device utilized as part of any baseband, RF, or optical communication network, or any combination of the above, and allows the user to observe the effects of their placement and movement at other locations or watch points chosen by the designer. Thus, the placement of components can be refined and fine tuned prior to actual implementation of a system to ensure that all required areas of the facility are provided with adequate communication system performance and that there are no areas with insufficient service, known as "dead zones," or poor network delay, known as "outages."

The present method for rapidly determining the ideal type, location and/or configuration of the communication components in a communication system offers significant value for communication system designers and provides a marked improvement over present day techniques.

To accomplish the above, a 3-D model of the environment is stored as a CAD model in an electronic database. The physical, electrical, and aesthetic parameters attributed to the various parts of the environment such as walls, floors, ceilings, trees, hills, foliage, buildings, and other obstacles which effect system performance or effect where equipment may be positioned are also stored in the database. A representation of the 3-D environment is displayed on a computer screen for the designer to view. The designer may look at the entire environment in simulated 3-D or zoom in on a particular building, floor, or other area of interest. The ideal embodiment of this system is detailed in pending application Ser. No. 09/318,841 entitled "Method and System for a Building Database Manipulator."

Positions within the 3-D model of the environment are defined to be any 2-D or 3-D point, region, or zone in the space defined by the 3-D environmental model. For example, a position could be a single point, a room in a building, a building, a city block, a hallway, etc. Using a mouse or other system input device, positions are identified within the three dimensional environment, hereinafter referred to as "boundary positions", and a desired performance metric is associated with each position. The performance metric may be in terms of received signal strength intensity (RSSI), throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio (SIR), signal-to-noise ratio (SNR), physical equipment price, installation cost, or any other communication system performance metric relevant to the communication system under design. Again using a mouse or other system input device, locations suitable for the placement of communication hardware components are identified within the modeled three-dimensional environment.

With the mouse or other input positioning device the designer may select and view various commercial communication component devices from a series of pull-down menus. The performance, cost, depreciation, maintenance requirements, and other technical and maintenance specifications for these communication components are stored in the computer, the ideal embodiment of which is detailed in pending application Ser. No. 09/318,842 entitled "Method and System for Managing a Real-Time Bill of Materials." Using the mouse or other input device, one or more communication hardware components may be selected for analysis. In addition, the characteristics of the input signal to each communication component may be identified (e.g., input power, frequency, etc.).

Thereafter, the system iterates through the set of selected communication components. Each communication component is then positioned automatically by the system at each of the locations selected by the user as suitable for communication component placement. At each location, each communication component device is then automatically configured into the set of possible configurations for the device. For each configuration, a communication system performance prediction model is run whereby the computer determines the predicted performance metric at each of the boundary positions and compares the predicted performance metric with the performance metric specified for the boundary position. The mean error and standard deviation between the predicted and specified performance metrics at each boundary position is stored for each configuration.

Once all iterations are finished, the system displays the results in a tabular format on the computer screen and/or prints and/or stores data in a memory device such as a computer card or disk, where each communication component is listed in each position and configuration along with the calculated mean error and standard deviation. The designer may sort the tabular output in any fashion. By selecting an entry in the table with the mouse or other input device, the designer may automatically add and position the selected communication component into the three-dimensional environment at the location and configuration specified in the table entry.

BRIEF DESCRIPTION OF THE DRAWINGS

The foregoing and other objects, aspects and advantages will be better understood from the following detailed description of a preferred embodiment of the invention with reference to the drawings, in which:

FIG. 4 shows a computer representation of the selection of desirable communication hardware components;

FIG. 14 is a computer display presentation of tabular results; and

DETAILED DESCRIPTION OF A PREFERRED EMBODIMENT OF THE INVENTION

The present invention represents a dramatic improvement over prior art by providing the design engineer with an automatic method and system for determining optimal communication equipment models, positions, and configurations within a facility. A detailed description of the general method taken by the present invention follows.

Using the present method, it is now possible to determine the ideal placement and configuration of communication hardware equipment within a facility in an automated fashion. The current embodiment is designed specifically for use with the SitePlanner Im suite of products available from Wireless Valley Communications, Inc. of Blacksburg, Va. However, it will be apparent to one skilled in the art that the method could be practiced with other products either now known or to be invented.

Figure 1:
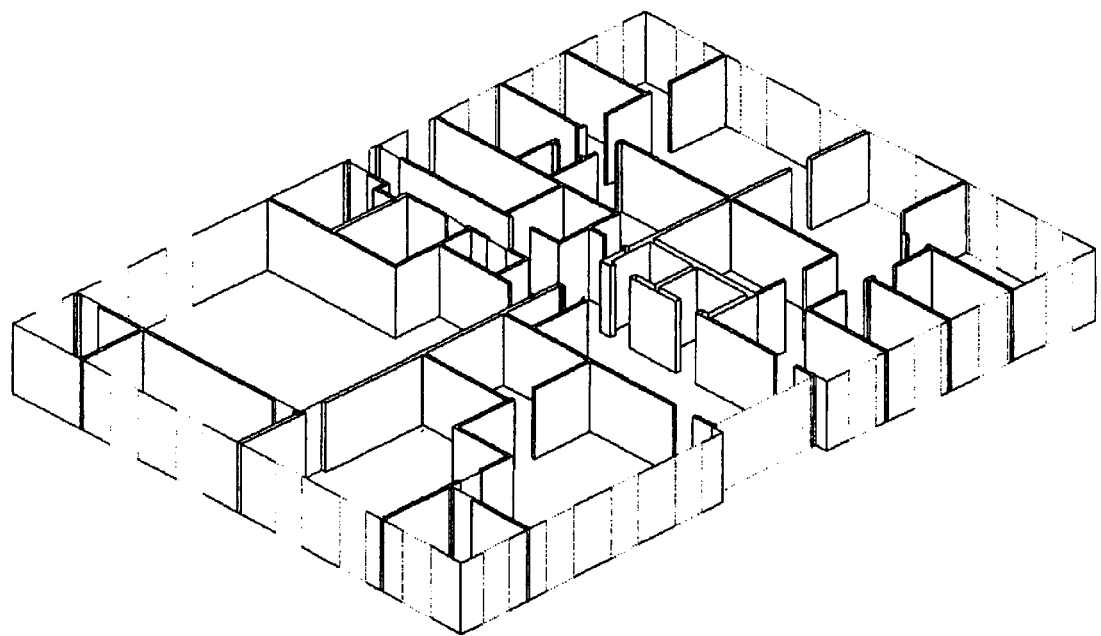
FIG. 1 shows an example of a simplified layout of a floor plan of a building.
Figure 2:
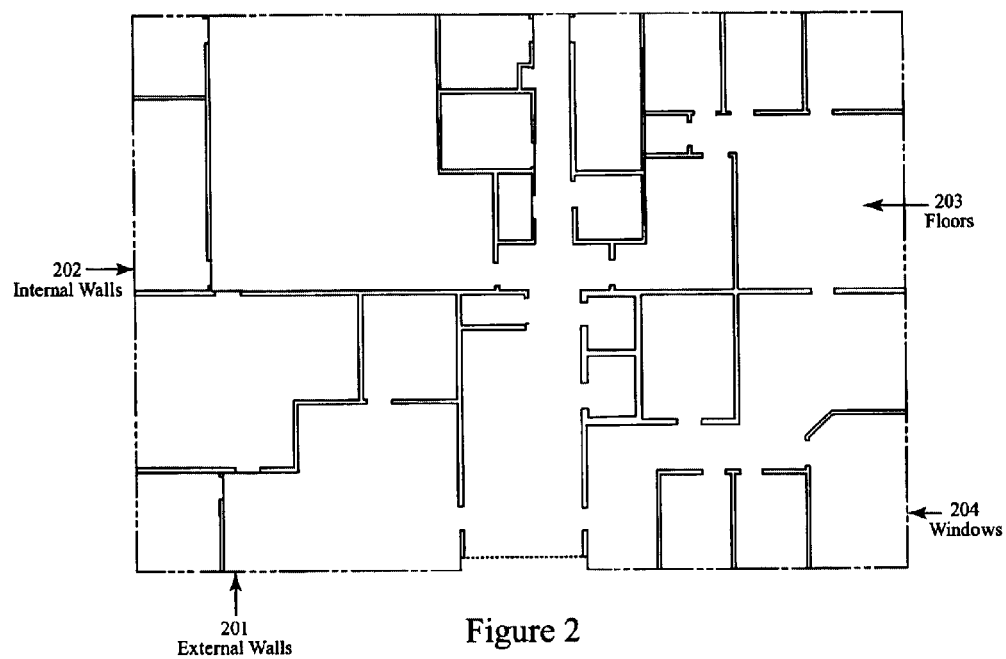
FIG. 2 shows an example of a simplified layout of a floor plan of a building from the top down perspective.

Referring now to FIG. 1, there is shown a three-dimensional (3-D) simplified example of a layout of a building floor plan. The method uses 3-D computer aided design (CAD) renditions of a building, or a collection of buildings and/or surrounding terrain and foliage hereafter termed a facility. However, for simplicity of illustration a 3-D figure representing a single floor of a single building is used. Referring to FIG. 2, there is shown the same building floor plan layout as in FIG. 1 with the view adjusted to provide a top-down, two-dimensional (2-D) perspective. The figures to follow utilize the top-down perspective for simplicity. Referring now to FIG. 2, the various physical objects within the environment such as external walls 201, internal walls 202 and floors 203 are assigned appropriate physical, electrical, and aesthetic values that are pertinent to communication system performance. For example, for the purposes of wireless communication system performance, outside walls 201 may be given a 10dB attenuation loss, interior walls 202 may be assigned 3 dB attenuation loss, and windows 204 may show a 2 dB RF penetration loss, meaning that a radio wave signal that intersects one of these wall will be attenuated by the amount assigned to each wall. In addition to attenuation, the obstructions 201, 202, 203, and 204 are assigned other properties including reflectivity, surface roughness, or any other parameter relevant to radio wave propagation prediction or communication system performance prediction. The 3-D environment database could be built by a number of methods, the preferred method being disclosed in the pending application Ser. No. 09/318,841 entitled "Method and System for a Building Database Manipulator" filed by T. S. Rappaport and R. R. Skidmore.

Estimated partition electrical properties can be extracted from extensive measurements already published, which are deduced from field experience, or the partition losses of a particular object can be measured directly and optimized instantly using the present invention combined with those methods described in the pending application Ser. No. 09/221,985, entitled "System for Creating a Computer Model and Measurement Database of a Wireless Communication Network" filed by T. S. Rappaport and R. R. Skidmore. Once the appropriate physical and electrical parameters are specified, any desired number of hardware components can be placed in the 3-D building database, and received signal strength intensity (RSSI), throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio (SIR), signal-to-noise ratio (SNR), physical equipment price, installation cost, depreciation and maintenance requirements or any other communication system performance metric can be predicted using a variety of performance prediction techniques and plotted directly onto the CAD drawing. Traffic capacity analysis, frequency planning, co-channel interference analysis, cost analysis, and other similar analyses can be performed in the invention. One skilled in the art can see how other communication system performance metrics may be easily incorporated through well-known equations and techniques.

The mathematical performance models used to predict wireless communication system performance in a desired environment may include a number of predictive techniques models, such as those described in the previously cited technical reports and papers, and in *SitePlanner® 2000 for Windows 95/98/NT/2000 User's Manual*, Wireless Valley Communications, Inc., Blacksburg, Va., 2000, hereby incorporated by reference. It would be apparent to one skilled in the art how to apply other system performance models to this method.

Similarly, the mathematical performance models used to predict wired communication system performance in a desired environment may include a number of predictive techniques.

Figure 3:
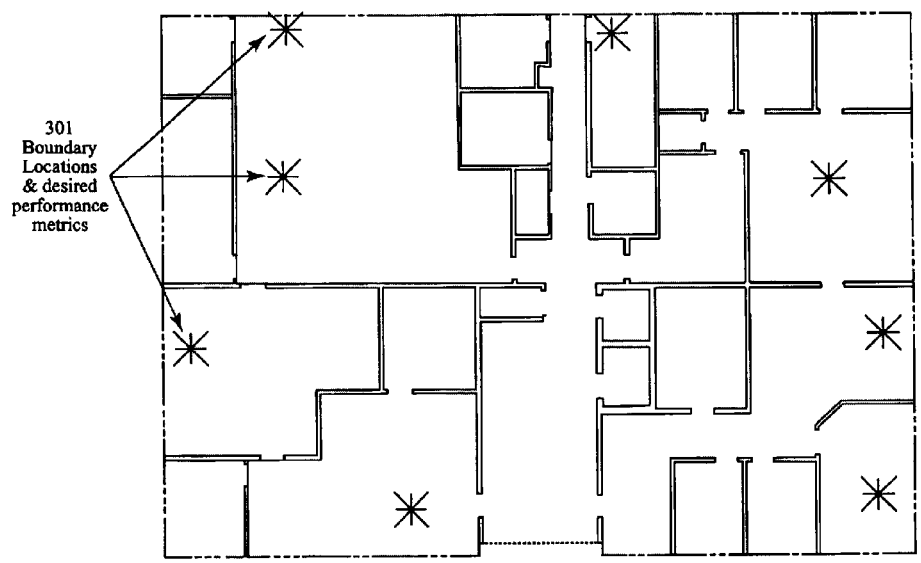
FIG. 3 shows a simplified layout of a floor plan of a building with boundary positions identified.

In the present embodiment of the invention, the designer identifies locations in the 3-D environmental database where certain levels of communication system performance are desirable or critical. These locations, termed "boundary positions", are points in three-dimensional space, which the designer identifies by visually pointing and/or clicking with a mouse or other input device at the desired location in the 3-D environmental database. Any number of such boundary positions may be placed throughout the 3-D environment at an location, including other building floors, outdoors, or which separate buildings. FIG. 3 depicts the facility layout with boundary locations and desired performance metrics specified 301. For example, such boundary locations may be anywhere in the modeled 3-D environment for the purposes of predicting the performance of a wireless communication system, or could identify telephone wall jacks, Ethernet ports, or other physical connections to a wired communication network. Although the display of the boundary locations in the present embodiment of the invention takes the form of textual strings which state the desired performance metric, colored cylindrical graphical entities whose color and/or height correspond to the desired performance metric, or asterisks as depicted in FIG. 3, one skilled in the art could see how the boundary positions could be identified and represented in other manners. In addition, boundary conditions for wireless communication systems may be determined automatically from an algorithm or via "best guess" initialization as described in H. D. Sherali, C. M. Pendyala, and T. S. Rappaport, "Optimal Location of Transmitters for Micro-Cellular Radio Communication System Design", IEEE Journal on Selected Areas of Communication, vol. 14, No. 4, May 1996.

Figure 4:
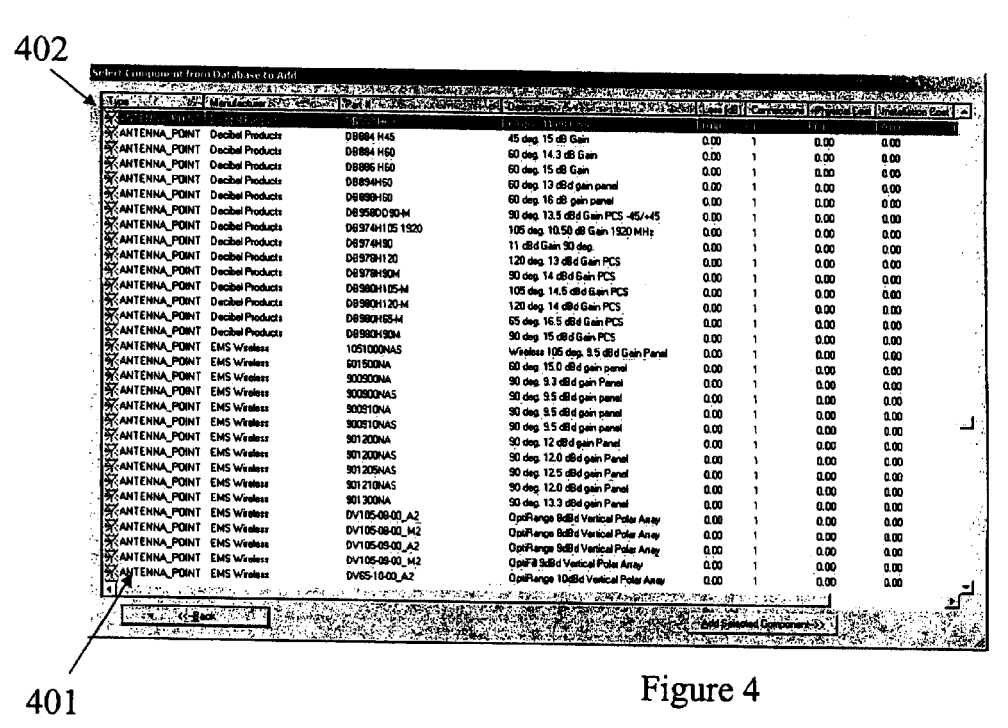

Referring now to FIG. 4, a selection window of various communication system hardware components is shown. FIG. 4 depicts a graphical selection window displayed in the present embodiment of the invention that enables the designer to select one or more communication component models from a displayed list of available models 401. The designer may select communication hardware components on the basis of manufacturer, part number, description, radiating characteristics, cost, or many other selection criteria. The list of available communication component models 401 is drawn from an electronic database of communication system components maintained in the present embodiment of the invention, and is fully detailed in pending application Ser. No. 09/318,842 entitled "Method and System for Managing a Real-Time Bill of Materials" filed by T. S. Rappaport and R. R. Skidmore, 09/652,853 entitled "Method and System for Designing or Deploying a Communications Network which Considers Component Attributes" filed by T. S. Rappaport and R. R. Skidmore, Ser. No. 09/632,853 entitled "Method and System for Designing and Deploying a Communications Network which Considers Component Attributes" filed by T. S. Rappaport, R. R. Skidmore, and E. S. Reifsnider, and Ser. No. 09/633,122 entitled "Method and System for Designing and Deploying a Communications Network which Allows Simultaneous Selection of Multiple Components" filed by T. S. Rappaport and R. R. Skidmore. The database of communication system components maintains detailed electromechanical, aesthetic, and budgetary information, such as physical cost, installation cost, and depreciation, for each hardware component, and is ideally suited for applications involving facilities and asset management, as well as communication system design and deployment. Using the mouse or other system pointing device, the designer may select one or more entries from the list of available communication component models 401 shown in FIG. 4. Selected entries 402 appear shaded to differentiate them from non-selected entries.

Figure 5:
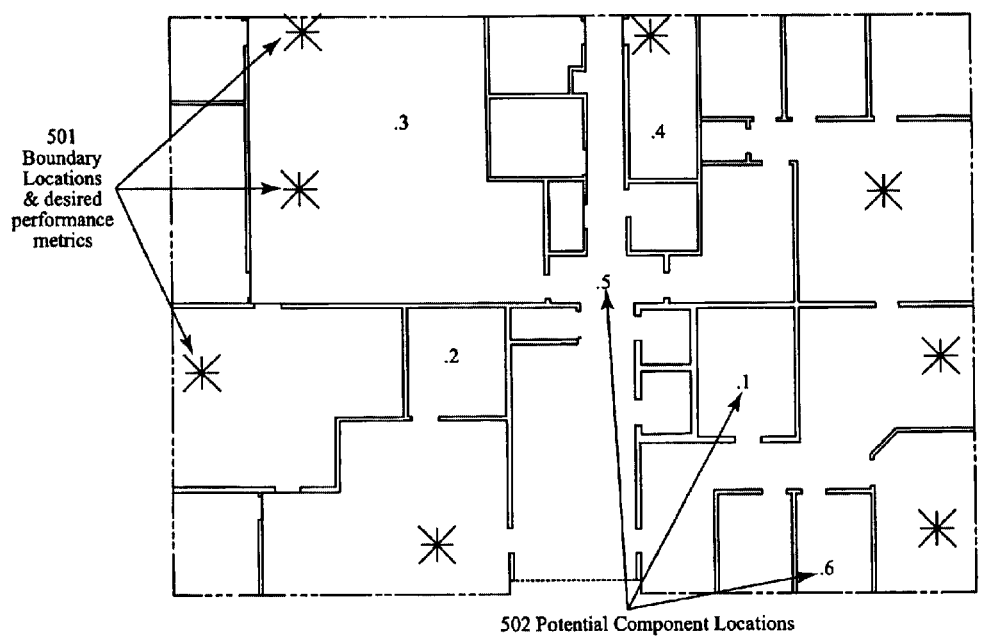
FIG. 5 shows a simplified layout of a floor plan of a building with both boundary positions and potential communication component locations identified.

In the present embodiment of the invention, the designer may identify one or more locations in the 3-D environmental database that are suitable for the placement of communication hardware equipment. This is done by pointing and/or clicking with the mouse or other input device on the desired locations in the 3-D environmental database. Desired locations may be specified anywhere within the modeled 3-D environmental database, including other building floors, outdoors, or within other modeled buildings. FIG. 5 depicts a simplified building layout containing both identified boundary positions 501 and identified potential communication component locations 502. One skilled in the art could see how the graphical identifiers for both the boundary positions and potential communication component locations could be identified and represented in other manners than those depicted in FIG. 5.

Alternately, the designer may choose to not specify locations for potential communication hardware placement but instead choose to allow the system to freely select potential locations. In this case, rather than identify individual locations using the mouse or other computer pointing device, the designer specifies the granularity of a three-dimensional grid that is overlaid onto the 3-D environmental database. Each point on the three-dimensional grid is treated as a potential location for the placement of communication component system equipment. For example, by identifying a three-dimensional grid with a granularity of 5 feet, the designer allows the system to automatically select a set of potential communication component equipment locations spanning the entire 3-D environmental database in three dimensions, where each location is exactly 5 feet from the surrounding locations. In addition, equipment locations for wireless communication systems may be determined automatically from an algorithm or via "best guess" initialization as described in H. D. Sherali, C. M. Pendyala, and T. S. Rappaport, "Optimal Location of Transmitters for Micro-Cellular Radio Communication System Design," IEEE Journal on Selected Areas in Communications, vol. 14, no. 4, May 1996. One skilled in the art could see how this concept could be expanded to account for other automatic techniques for selecting a set of locations within a three-dimensional environmental model.

Figure 6:
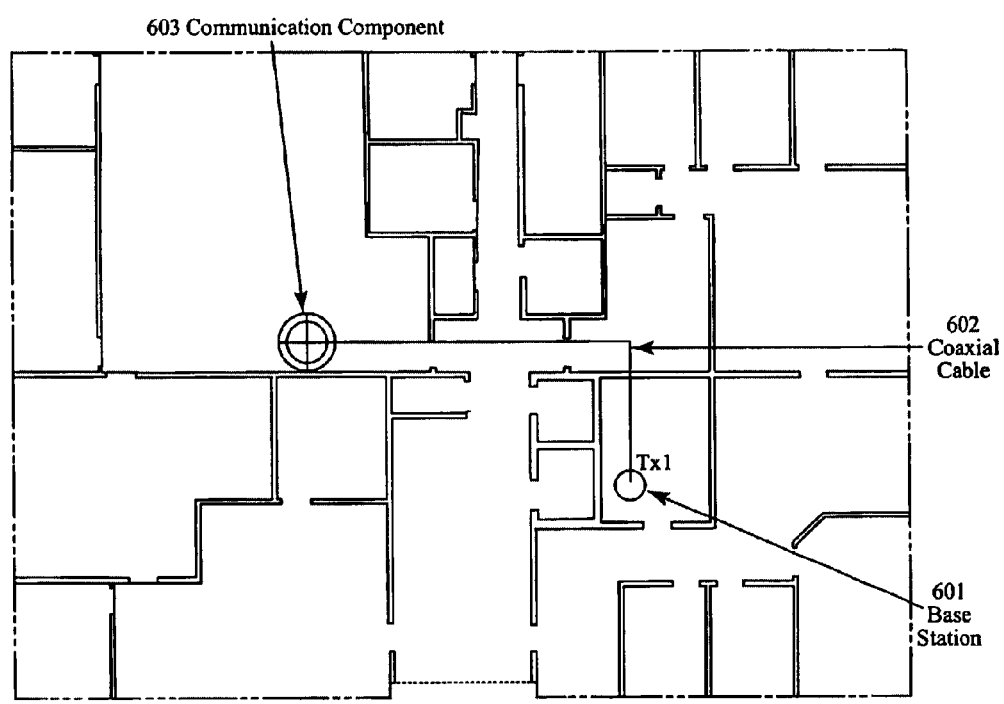
FIG. 6 shows a simplified layout of a floor plan of a building with a communication system in place.

Alternately, a full communication system may be modeled by the system within the 3-D environmental database. Drawing from components described in the aforementioned electronic database of communication components, the designer may visually position communication hardware components within the 3-D environmental database. These hardware components include but are not limited to: base stations, repeaters, amplifiers, connectors, splitters, coaxial cables, fiber optic cables, communication components, routers, hubs, leaky feeder or radiating cables, or any other single or composite communication hardware device utilized as part of any baseband, RF, or optical communication network, or any combination of the above. The system records and manages the interconnections between the communication system components and displays the resulting communication system overlaid onto the 3-D environmental database as shown in FIG. 6. Referring to FIG. 6, a base station 601 is positioned in a building and has a length of coaxial cable 602 and a communication component 603 connected to it. The ideal embodiment of this technique of selecting, positioning, and interconnecting communication hardware components is detailed in pending application Ser. No. 09/318,842 entitled "Method and System for Managing a Real Time Bill of Materials", submitted by T. S. Rappaport and R. R. Skidmore. Given such a system, the designer may choose to use the current locations of communication components in the existing communication system as it is placed and modeled in the 3-D environmental database as opposed to or in addition to identifying other potential locations for communication equipment. This is done using a mouse or other computer input pointing device by selecting the locations of the existing communication components within the 3-D environmental database.

For each communication component model selected in FIG. 4, the corresponding input signal to the communication component may be specified. In the current embodiment of the system, for each communication component selected by the designer a corresponding input signal power and frequency and bandwidth of operation may be specified. For example, the designer may specify that one or more of the selected communication component models be considered to have an input signal power of 0 dBm and operate at 1950 MHz for a wireless communication system. One skilled in the art could see how additional input signal characteristics could easily be incorporated into the current system. Alternately, if the selected communication component positions coincide with the positions of existing communication components modeled in the 3D environment by the system, the input signal characteristics of the existing communication components is utilized. For example, if the designer has modeled a communication system within the 3D environment, the current characteristics of the input signals to the communication components, which are defined by the current communication system configuration, may be utilized as the input signals as opposed to the designer manually specifying the characteristics of the input signals.

For each selected communication component in FIG. 4, the designer may also limit or otherwise restrict the set of possible configurations into which communication equipment may be placed, where a configuration could define a specific orientation, rotation, physical placement or proximity to other devices or obstructions, manual switch or adjustment settings, or electrical switch or adjustment settings, or any other form of configuration pertinent to a communication hardware device. The restrictions may be performed on an individual configuration basis, whereby the designer may specifically identify a set of configurations that are viable, or may be established as a range of possible rotation angles. Alternately, the designer may place no restrictions on the set of possible configurations, in which case the system automatically defines a finite set of possible configurations based upon the characteristics of the specific device. For example, for a selected antenna component for use in a wireless communication system, the set of all possible configurations is a set of equally spaced rotations about all coordinate axes.

Figure 7:
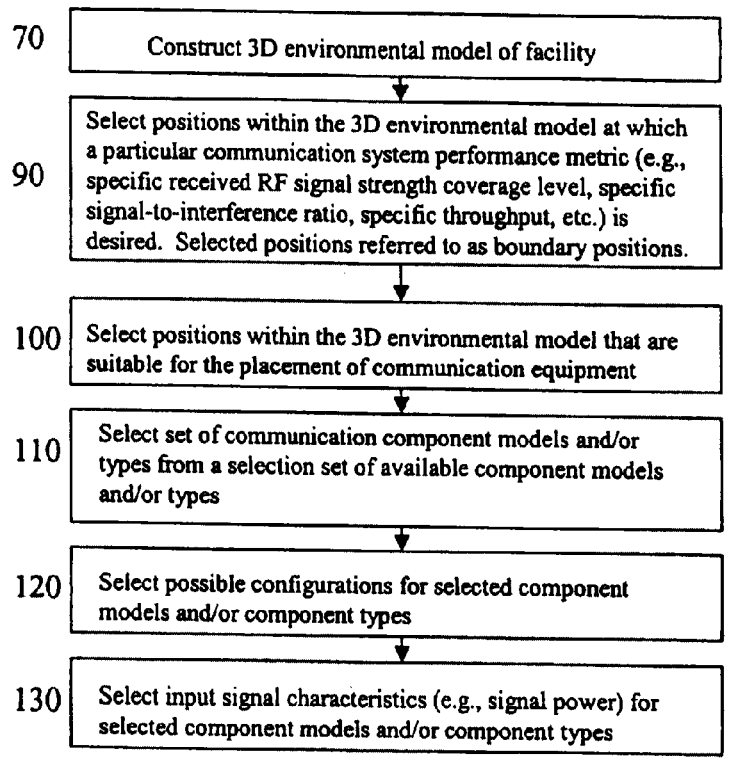
FIG. 7 is a flow diagram of a general method according to the invention.

Referring now to FIG. 7 there is shown the general method of the present invention. Before one can carry out a performance predictive model on a desired environment, a 3-D electronic representation of that environment must be created in function block 70. The preferred method for generating a 3-D building or environment database is disclosed in pending application Ser. No. 09/318,841, entitled "Method And System for a Building Database Manipulator," filed by T. S. Rappaport and R. R. Skidmore. The resulting definition utilizes a specially formatted vector database format. The arrangement of graphical entities such as lines and polygons in the database corresponds to obstructions/partitions in the environment. For example, a line in the 3D database could represent a wall, a door, tree, a building wall, or some other obstruction/partition in the modeled environment.

From the standpoint of wireless communication system performance and radio wave propagation, each obstruction/partition in an environment has several electromagnetic properties. When a radio wave signal intersects a physical surface, several things occur. A certain percentage of the radio wave reflects off of the surface and continues along an altered trajectory. A certain percentage of the radio wave penetrates through or is absorbed by the surface and continues along its course. A certain percentage of the radio wave is scattered upon striking the surface. The electromagnetic properties given to the obstruction/partitions define this interaction. Each obstruction/partitions has parameters that include an attenuation factor, surface roughness, and reflectivity. The attenuation factor determines the amount of power a radio signal loses upon striking a given obstruction. The reflectivity determines the amount of the radio signal that is reflected from the obstruction. The surface roughness provides information used to determine how much of the radio signal is scattered and/or dissipated upon striking an obstruction of the given type.

From the standpoint of wired communication system performance, the size, position, and material composition of obstacles in the environment (e.g., walls, doors, hallways, buildings, trees, roadways, etc.) determine the possible locations at which communication equipment may be positioned and the locations at which a user may connect to the network. For example, the arrangement of walls in a building may determine the placement of Ethernet ports or other physical connections to a wired computer network being put into place.

Using a mouse or other computer pointing device, the designer may identify one or more locations within the 3-D environmental model of the facility at which a certain performance metric is desirable in function block 90. Selected positions, referred to hereafter as boundary positions, may reside at any location within the 3-D environmental model of the facility, including other building floors, other buildings, and outside. For example, such boundary locations may be anywhere in the modeled 3-D environment for the purposes of predicting the performance of a wireless communication system, or could identify telephone wall jacks, Ethernet ports, or other physical connections to a wired communication network. For each boundary position, the designer also lists one or more desired performance metrics. These performance metrics include but are not limited to received signal strength intensity (RSSI), throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio (SIR), signal-to-noise ratio (SNR), physical equipment price, installation cost, or any other communication system performance metric.

In function block 100, the designer may identify locations within the 3-D environment that are suitable for communication component placement. This is done using a mouse or other computer pointing device, and selected locations may reside anywhere within the modeled 3-D environment, including other building floors, other buildings, and outside.

In function block 110, the designer is presented with a list of communication hardware components similar to FIG. 4. The list of communication hardware components is drawn from a database of communication hardware devices, the preferred embodiment of which is detailed in pending application Ser. No. 09/318,842, entitled "Method and System for Managing a Real Time Bill of Materials," filed by T. S. Rappaport and R. R. Skidmore. Using the mouse or other computer pointing device, the designer may select one or more entries from the presented list of communication components. The selected set of communication components represents one or more communication component models and/or communication component types that the designer feels is desirable. Each communication component thus selected has operating parameters that defines the functioning of the communication component. For example, an antenna has a specific radiating pattern that defines the manner in which radio signals are transmitted from it, while a computer network router has a maximum traffic loading. This information is obtained from the database of communication hardware devices.

For each communication component model and/or communication component type selected in function block 110, the designer may specify the set of valid configurations for the communication component. In function block 120, the designer may specifically select a set of configurations by identifying specific settings for the device, or may identify a range of desirable configurations by identifying a range of possible settings. For example, if the selected device was an antenna, possible configurations for the antenna may involve the orientation of the antenna with respect to a coordinate axis. In which case, the designer could specify 30 to 45 degrees counterclockwise about the X-axis as a valid range of rotation angles for the antenna.

In function block 130, the designer identifies the input signal characteristics for each of the communication components selected in function block 110. The input signal characteristics define the input power, frequency, modulation, throughput, arrival rate, and other aspects of the communication signal being input into the communication component from the communication system. The characteristics and configuration of the communication component define the reaction of the communication component based on the input signal, and therefore define the effect on the output from the communication component and the impact on the communication system performance as a result.

One skilled in the art could see how the order of the function blocks in FIG. 7 could be altered within the scope of the same overall concept of the invention.

With reference to FIGS. 7–12, the same numbers for function blocks in different figures denote the same function, and differences in methodologies are denoted by different numbered function blocks.

Figure 8:
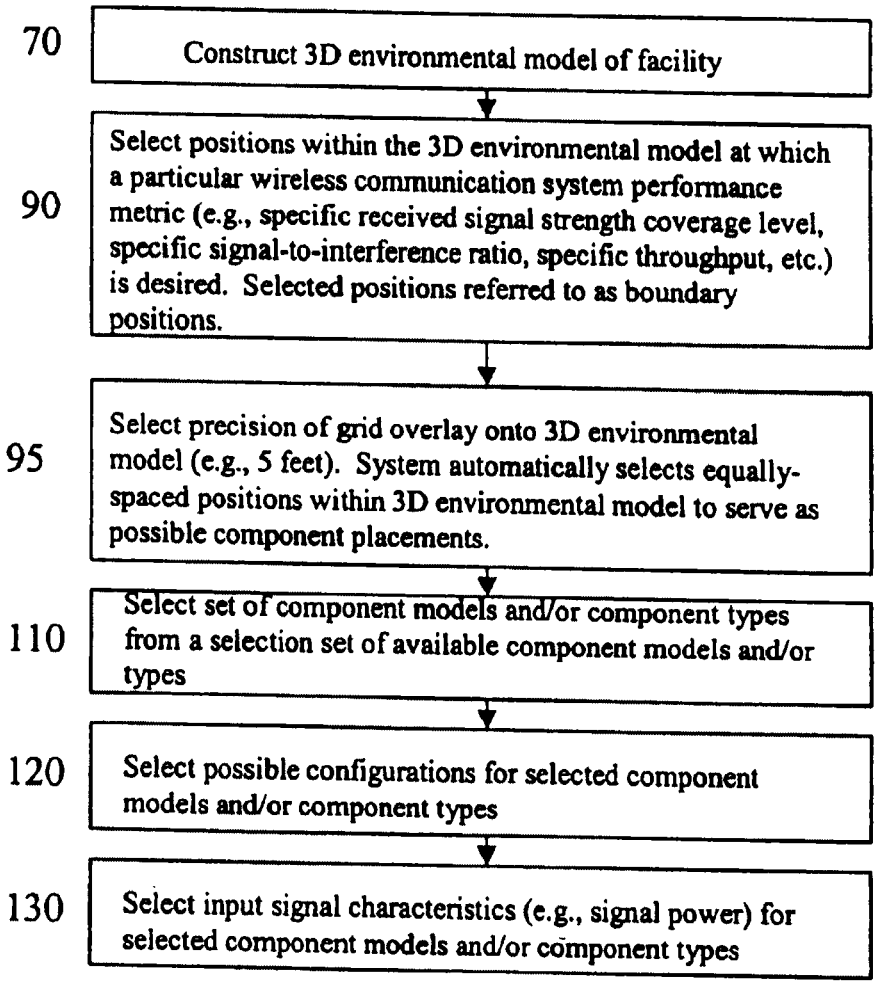
FIG. 8 is a flow diagram according to an alternative method of the invention.

Referring now to FIG. 8 there is shown an alternate method of the present invention. A 3-D environmental model of the facility is constructed in function block 70. Afterwards, boundary positions are identified in function block 90. However, instead of identifying specific positions within the 3-D environmental model that are suitable for the placement of communication hardware components, the designer may elect to automatically select a set of equally spaced positions in 3-D within the environmental model. In function block 95, the designer specifies a precision factor that identifies the spacing of the positions to be automatically selected. For example, the designer may specify a precision of 5 feet. The present invention then overlays the 3-D environmental model with a 3-D grid of points, where each point is equally spaced from all neighboring points based on the precision factor entered by the designer. For example, the present invention automatically overlays the environmental model with a 3-D grid of points where each point is exactly feet from all neighboring points. The points comprising the 3-D grid resulting from the choice of precision factor are then automatically selected by the invention to be the set of locations deemed suitable for communication component placement. The designer may then identify the desired set of communication component models and/or communication component types in function block 110, the set of possible configurations for the selected communication components in function block 120, and the input signal characteristics to the selected communication components in function block 130 as described previously.

Figure 9:
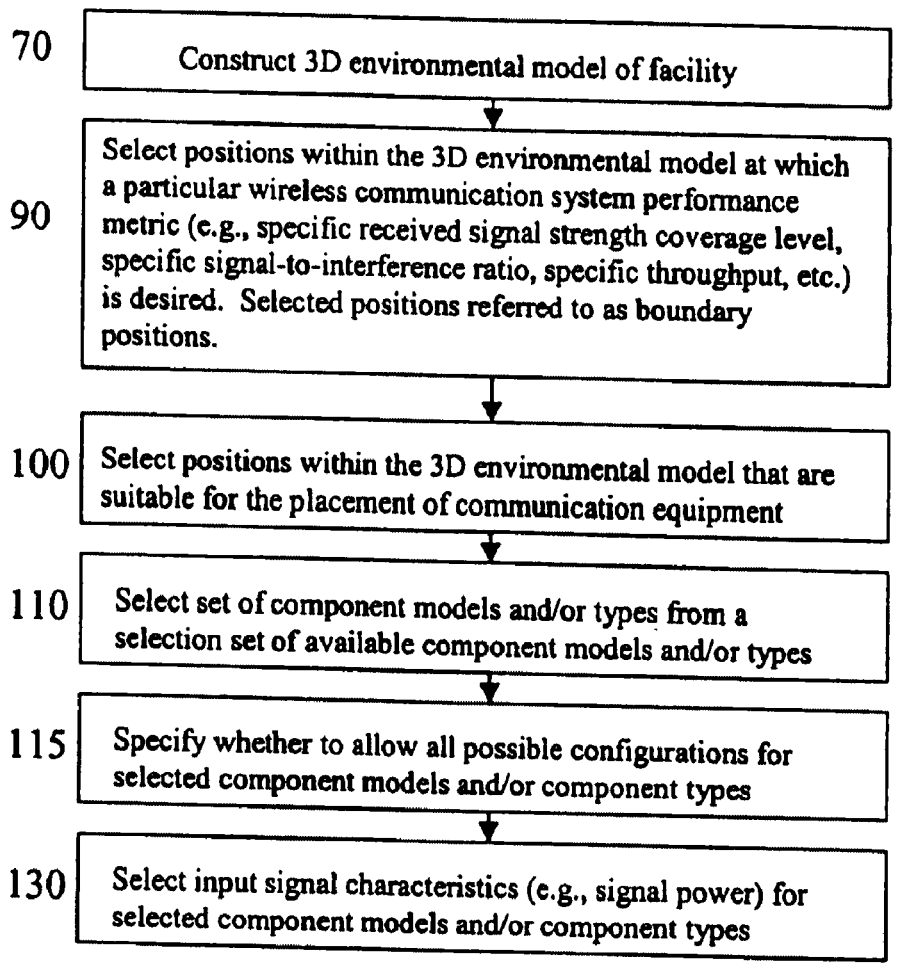
FIG. 9 is a flow diagram according to an alternative method of the invention.

Referring now to FIG. 9 there is shown an alternate method of the present invention. In FIG. 9, function blocks 70, 90, 100, and 110 are identical in form and function to those described previously. In function block 115, the designer may elect to allow all possible configurations for selected communication components. In this instance, the present invention will automatically select a finite set of configurations representing possible settings of the communication components. The designer may specify the input signal characteristics for the selected communication components in function block 130 as described previously.

Figure 10:
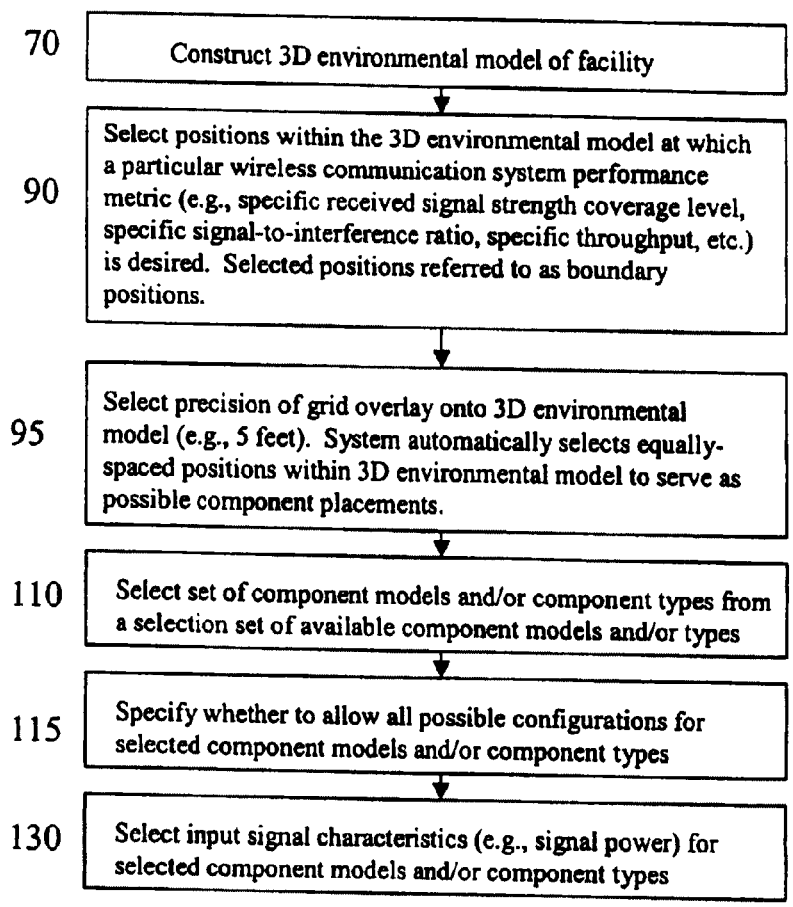
FIG. 10 is a flow diagram of the general method of the present invention.

Referring now to FIG. 10 there is shown an alternate method of the present invention. In FIG. 10, function blocks 70, 90, 95, 110, 115, and 130 are identical to those described previously. The method detailed in FIG. 10 is one in which the designer combines the automatically selection of a set of equally spaced positions in 3-D within the environmental model in function block 95 with the automatic selection of the possible communication component configurations in function block 115.

Figure 11:
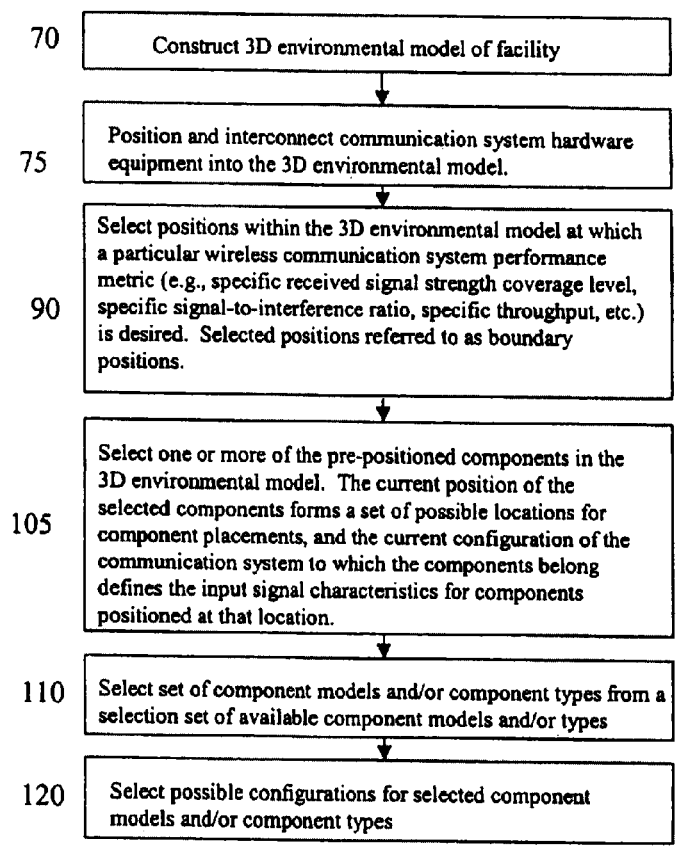
FIG. 11 is a flow diagram of an alternate method of the present invention.

Referring now to FIG. 11 there is shown an alternate method of the present invention. After constructing a 3-D environmental model of the facility in function block 70, the user then positions a model of a communication system within the 3-D environmental model. In function block 75, communication components and other types of communication system components are selected from a components database of communication hardware devices that may include a variety of commercially available devices. Each hardware component is placed at a desired location within the 3-D environment, for instance, in a specific room on a floor of a building or on a flagpole in front of a building. Any number of other components and devices may be created and placed either within or connected to each communication component system. These components include, but are not limited to: cables, leaky feeder communication components, splitters, connectors, routers, hubs, amplifiers, or any other single or composite communication hardware device utilized as part of any baseband, RF, or optical communication network, or any combination of the above. The preferred embodiment of the components database of communication hardware devices and the method of selecting, placing, and interconnecting components to form models of communication systems in a 3-D environment is detailed in pending application Ser. No. 09/318,842, entitled "Method and System for Managing a Real Time Bill of Materials," filed by T. S. Rappaport and R. R. Skidmore. FIG. 6 provides a representation of a simple wireless communication system positioned within a 3-D environmental model.

In FIG. 11, the designer is able to position boundary positions as discussed above in function block 90. In function block 105, the designer selects from a list of the communication components positioned within the 3-D environmental model from function block 75. The positions of the selected communication components within the 3-D environmental model serves as the set of possible communication component locations. By selecting from the list of communication components that are already positioned in the drawing, the designer is restricting the invention to utilizing the locations at which those existing communication components reside within the 3-D environmental model. The input signal characteristics are then automatically determined by the invention to be the current input signals to the existing communication components in the 3-D environmental model that were selected. For example, if the designer selects a particular communication component that already exists in the 3-D environmental model in function block 105, the position of the selected communication component is added to the set of possible communication component locations and the input signal characteristics of the selected communication component, which are defined based upon the current configuration and settings of the communication system of which the selected communication component is a part, are used in place of the designer needing to specify them. Function blocks 110 and 120 proceed as discussed above, and are identical to previous methods.

Figure 12:
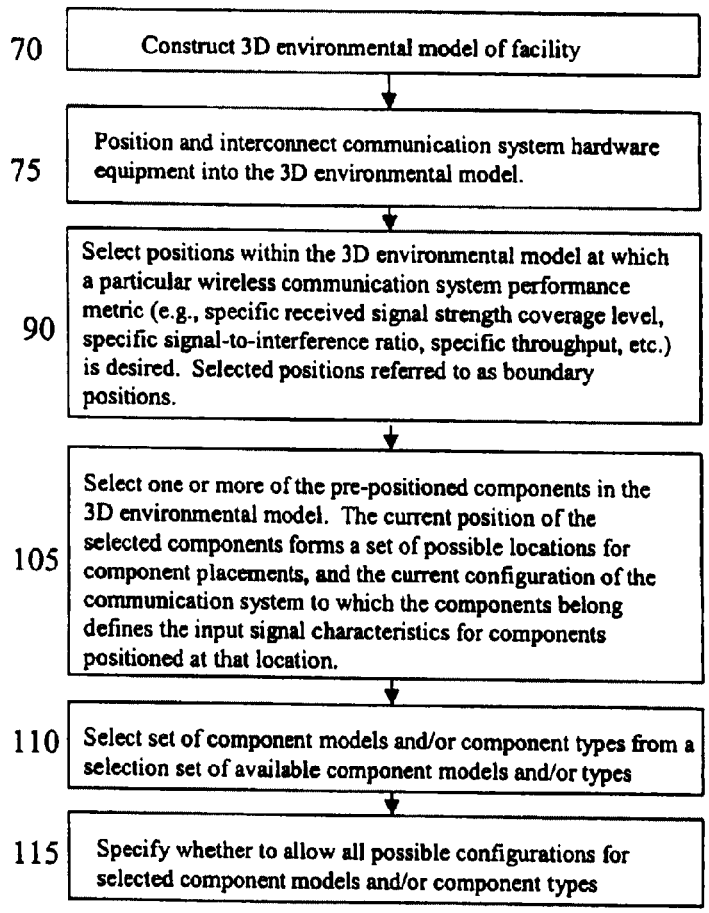
FIG. 12 is a flow diagram of an alternate method of the present invention.

Referring now to FIG. 12, there is shown an alternate method of the present invention. In FIG. 12, function blocks 70, 75, 90, 105, 110 and 115 are identical to those described previously. The method detailed in FIG. 12 is one in which the designer combines the placement of representations of communication system equipment in 3-D within the environmental model in function block 75 with the automatic selection of the possible communication component configurations in function block 115.

Figure 13:
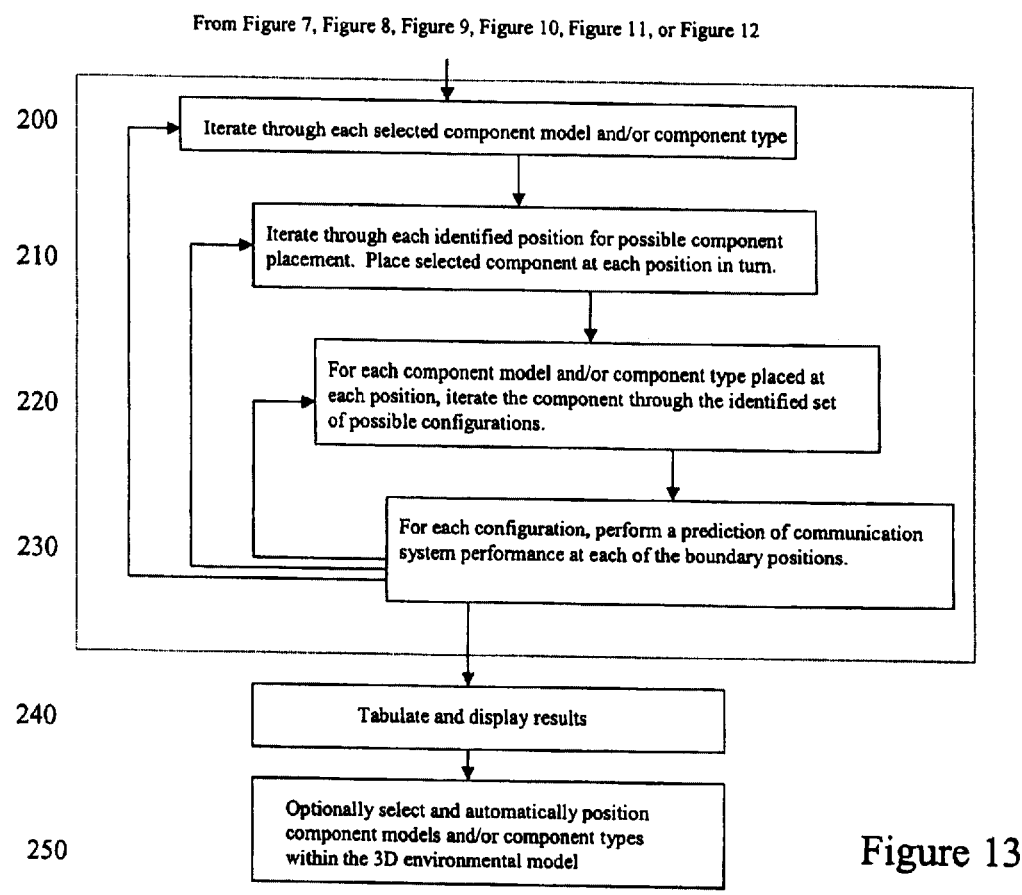
FIG. 13 is a flow diagram of an alternate method of the present invention.

Referring now to FIG. 13, there is shown the general solution method of the present invention. The method shown in FIG. 13 is shared among all previous methods, and follows directly in sequence from the methods detailed in FIGS. 7, 8, 9, 19, 11, and 12. In FIG. 13, the designer has provided the invention with a selected, finite set of boundary positions within the 3-D environmental model of the facility. Each boundary position has one or more performance metrics associated with it representing the desired communication system performance at that location in the facility. The designer has also provided a finite set of locations within the 3-D environmental model of the facility that represent possible positions at which communication hardware components could be placed within the facility. The designer has also provided a selected set of communication component models and/or communication component types that are available for placement in the facility. The operating characteristics of each selected communication component model and/or communication component type is drawn from a hardware components database. The designer has also provided the input signal characteristics, such as input signal power and frequency, for the selected communication components. Finally, the designer has also provided a set of valid configurations for the selected communication components. Given this information, the method shown in FIG. 13 is applied.

In function block 200, the system iterates through each of the selected communication components in turn. For each communication component, information regarding its radiating characteristics is drawn from a database of communication hardware components. For each selected communication component in function block 200, the system iterates through each of the set of possible communication component locations in function block 210. For each selected position in the 3-D environmental model, a model of the selected communication component is placed at that location. For each selected communication component and each selected position, the system iterates through each of the possible configurations for the communication component in function block 220.

For each selected communication component at each selected position and each valid configuration, the system predicts the expected performance metrics at each boundary location. The operating characteristics of the selected communication component are known, as are the input signal characteristics. The communication component is positioned by the system within a known 3-D environmental model in a defined configuration. The 3-D environmental model of the facility contains information relevant to the prediction of communication system performance, as detailed in pending application Ser. No. 09/318,841, entitled "Method And System for a Building Database Manipulator," filed by T. S. Rappaport and R. R. Skidmore.

A variety of different performance prediction models are available and may be used for predicting and optimizing communication component placements and component selections. The models combine the electromechanical properties of each component in the communication system (e.g., noise figure, attenuation loss or amplification, communication component radiation pattern, etc.), the electromagnetic properties of the 3-D environmental database, and radio wave propagation techniques to provide an estimate of the communication system performance. Preferred predictive models include:

Wall/floor Attenuation Factor, Multiple Path Loss Exponent Model,
Wall/floor Attenuation Factor, Single Path Loss Exponent Model,
True Point-to-Point Multiple Path Loss Exponent Model,
True Point-to-Point Single Path Loss Exponent Model,
Distance Dependent Multiple Breakpoint Model,
Distance Dependent Multiple Path Loss Exponent Model,
Distance Dependent Single Path Loss Exponent Model, or other models, such as ray tracing and statistical models, as desired by the design engineer.

The physical and electrical properties of obstructions are specified in the 3-D environment. Although not all parameters are used for every possible predictive model, one skilled in the art would understand which parameters are necessary for a selected model. Parameters that may be entered include:

1. Prediction configuration—received signal strength intensity (RS SI), throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio (SIR), signal-to-noise ratio (SNR), physical equipment price, and/or installation cost;
2. Mobile Receiver (RX) Parameters—power, communication component gain, body loss, portable RX noise figure, portable RX height above floor;
3. Physical and Installation Cost
4. Traffic, Call or Packet Arrival Rate
5. Propagation parameters—
  6. Partition Attenuation Factors
  7. Floor Attenuation Factors
  8. Path Loss Exponents
  9. Multiple Breakpoints
  10. Reflectivity
  11. Surface Roughness
  12. Antenna Polarization
  13. Maximum and Mean Excess Multipath Delay
  14. Other parameters as necessary for a given model From the standpoint of radio wave propagation, each obstruction/partition in an environment has several electromagnetic properties. When a radio wave signal intersects a physical surface, several things occur. A certain percentage of the radio wave reflects off of the surface and continues along an altered trajectory. A certain percentage of the radio wave penetrates through or is absorbed by the surface and continues along its course. A certain percentage of the radio wave is scattered upon striking the surface. The electromagnetic properties given to the obstruction/partitions define this interaction. Each obstruction/partitions has parameters that include an attenuation factor, surface roughness, and reflectivity. The attenuation factor determines the amount of power a radio signal loses upon striking a given obstruction. The reflectivity determines the amount of the radio signal that is reflected from the obstruction. The surface roughness provides information used to determine how much of the radio signal is scattered and/or dissipated upon striking an obstruction of the given type.

For wired communication system design, the prediction of communication system performance is carried out by predicting the individual performance for all wired network components separately and then combining the results to acquire the net performance. To predict the performance of a wired communications link it is a matter of combining the known effects of each piece of wired equipment for the specific network settings such as firmware version, operating system version, protocol, data type, packet size, and traffic usage characteristics, and the traffic load on the network.

The throughput and bandwidth of a network are calculated by the invention as functions of any or all of distance between transmitter and receiver, environment, packet sizes, packet overhead, modulation techniques, environment, interference, signal strength, number of users, protocol, coding scheme, and 3-D location for wireless portions of a data communications network. So, in order to predict the bandwidth and throughput of a network connection, the appropriate functions and constants, last update date, must be calculated from the listed parameters and then predicted for each location and time desired.

Propagation delay is predicted for wired portion of a data communication networks by dividing the distance traveled by the propagation speed of electrical, electromagnetic or optical signals in the device. For instance, data in a fiber optic cable travels at a speed $3 \times 10^8$ meters per second because photons in a fiber optic cable are used to transmit the data and these move at the speed of light. If the cable is 300 meters long the transmission delay is equal to $1 \times 10^6$ seconds.

Predicting the propagation delay for a wireless portion of a data communications network is slightly more difficult. The same calculation is used as for wired network except additional delays are included. These additional delays are needed to account for the fact that wireless data does not always move in a straight line. Thus to calculate the transmission delay of a wireless link in a data communications network, the distance between the transmitter and the receiver is divided by the propagation speed ($3 \times 10^8$ meters per second) of a wireless communications link and then added to the multipath delay introduced by the indirect paths taken from transmitter to receiver as is shown in equation 1.

$$T_p = \frac{d}{3*10^8 m/s} + \tau_d \qquad 1$$

Where $T_p$ is the transmission delay, d is the distance between the transmitter and the receiver, and $\tau_d$ is the multipath delay. Predicting the multipath delay can be done by raytracing techniques or based on angle of arrival, or signal strength values.

Transmission delay is directly calculated from the bandwidth of a channel. To calculate it, the number of bits transmitted must be known. To calculate it, the number of bits that is transmitted is divided by the bandwidth. This calculation is identical for wired and wireless channels but must be performed separately for each network device. The equation is illustrated here in equation 2.

$$T_t = \frac{\# \text{ of bits}}{BW} \qquad 2$$

Where $T_t$ is the transmission delay time, # of bits are the number of bits in the transmission or packet and BW is the bandwidth of the network link.

Processing delay, like transmission delay does not need to be calculated differently for wireless or wired devices. Rather, it must be calculated for each device separately. Since processing delay is the time required for a network device to process the reception or transmission of data bits, it is zero for devices that do not perform any computer or microprocessor processing such as cables, antennas, or splitters. Processing time may depend on the packet size, protocol type, operating system, firmware and software versions, and the type of device and the current computing load on the device. To predict the processing delay of any device it is necessary use a model which accounts for all of these effects.

Queuing delay is only applicable to devices which transmit data from multiple processes or multiple users. The queuing delay of a device is the amount of time a particular packet must wait for other traffic to be transmitted. It is difficult to predict the queuing delay of a particular connection because it depends on the amount of traffic handled by a particular device. For this reason queuing delay can be predicted using a statistical random variable based on the expected performance of the device and/or the expected traffic. Alternatively average, median, best or worst case queuing delay times could be used to calculate a predicted queuing delay time.

Packet latency, round trip times and handoff delay times are all based on propagation, transmission, and processing and queuing delay times. To accurately predict packet latency and round trip time, the propagation, transmission, processing and queuing delay times must be summed for all network devices in a particular network link and adapted for the particular traffic type, packet size, and protocol type. For instance, packet latency is the time required for a packet to travel from transmitter to receiver. To predict packet latency for a particular link the propagation, transmission, processing and queuing delay times must be calculated for the specific network connection, traffic type, packet size and network connection for the one-way transmission of a packet.

Round trip times are calculated similarly, except for the transmission and reception of a packet and the return of the acknowledging packet. Thus, to predict the round trip time, the invention takes into account the original packet size and the size of the acknowledging packet as well as the effect of the specific network connection, protocol and traffic type on the propagation, transmission, processing and queuing delays calculate the predicted round trip time.

Handoff delay times are based on the propagation, transmission, processing and queuing delays involved in two separate wireless access points coordinating the change of control of a wireless device from one access point to another. These delays result because the two access points must transmit data back and forth to successfully perform a handoff Thus, the prediction of handoff delay time is similar to the prediction of the packet latency time between the two access points. To predict the handoff delay time, the invention calculates the propagation, transmission, processing and queuing delays depending on the specific number of transmissions required and the size of the data which must be sent, while accounting for expected traffic, protocol, packet size and other relevant information.

When predicting bit error rates, the invention carefully separates wired and wireless error rates. This is because wireless connections are significantly more prone to data errors than wired channels. For wired channels, bit error rates are simply a measure of the electrical, optical and electromagnetic parameters of a connection and are predicted using a statistical random variable. The statistical random variable can be dependant on the electrical, optical and electromagnetic characteristics of each device such as voltage levels, power levels, impedance, and operating frequencies, or can be generated using a typical value for the particular device. For instance, copper wire is often modeled as having a bit error rate of 1 in $10^6$ or $10^7$.

Wireless bit error rates are dependant on many more factors than wired bit error rates. For this reason, the invention predicts wireless bit error rates based on the environment, distance between transmitter and receiver, number and types of partitions obstructing the transmission, time, 3-d position, packet size, protocol type, modulation, radio frequency, radio frequency bandwidth, encoding method, error correction coding technique, multipath signal strengths and angle of arrival, and multipath delay. As a result the calculation of the predicted bit error rate is performed using constants to convert from known channel and network equipment settings to an expected bit error rate.

Frame error rates, packet error rates and packet drop rates can all be calculated from bit error rates or predicted directly using the same method as for a bit error rate as described above. To perform these calculations the invention uses information stored in the site-specific Bill of Materials about the packet size, frame size and the protocol in use. To predict a packet error rate, information about the number of bit errors necessary to cause a packet error, frame error or packet drop to occur. The invention uses the specific protocol information to calculate this and uses a protocol specific constant to convert bit error rates.

Bandwidth delay products can be calculated by the invention directly using information about any or all of the environment, three dimensional position, protocol type, multipath delay, packet sizes, radio frequency, radio frequency bandwidth, coding, number, strength and angle of arrival of multipath components, signal strength, transmission, propagation, processing and queuing delay, bit error rate, packet error rate, and frame error rates. Alternatively the invention can calculate the bandwidth delay product indirectly using previously predicted values. A bandwidth delay product is calculated by multiplying the bandwidth of a certain network device by the total delay introduced by that device. Thus:

$$BWD = \frac{BW}{T_{net}} \quad 3$$

Where BWD is the bandwidth delay product, BW is the bandwidth and $T_{net}$ is the total delay introduced.

The invention uses statistical models of the consistency of data communications network hardware to predict jitter and quality of service (QoS). Both of these performance criterion are measures of the reliability of a network to provide consistent data arrival times. Thus, to calculate the QoS or jitter of a connection, the invention uses formulas which include any or all of the environment, three dimensional position, protocol type, multipath delay, packet sizes, radio frequency, radio frequency bandwidth, coding, number, strength and angle of arrival of multipath components, signal strength, transmission, propagation, processing and queuing delay, bit error rate, packet error rate, frame error rate, throughput, bandwidth, and bandwidth delay product. The formulas include constants which relate the above variables in general to the variation in the arrival time of data and in specific to the QoS and jitter of a connection.

Using one of the performance predictive techniques, the system predicts the desired performance metrics at each boundary position. The results of these calculations are stored for later tabulation and display.

Figure 14:
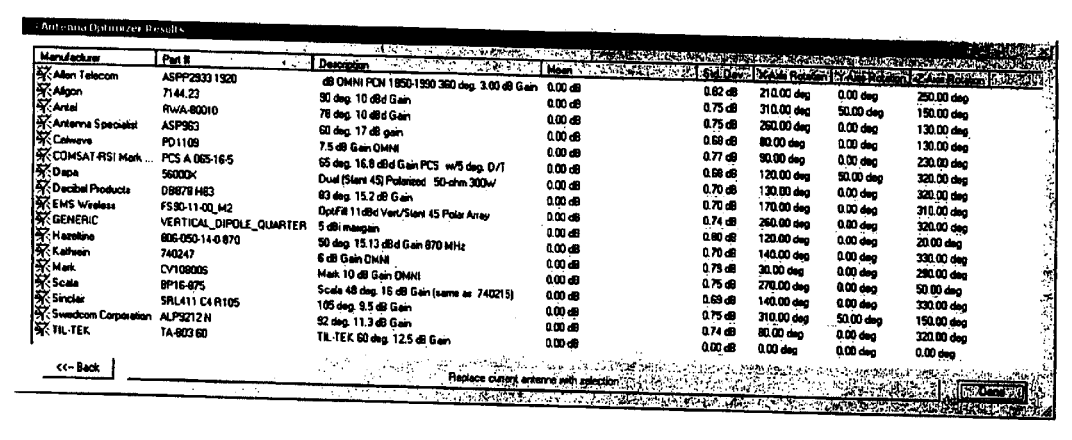

Using the iterative process defined in function blocks 200, 210, 220, and 230 in FIG. 13, the system processes all designer input. The results are tabulated and displayed in function block 240. The system displays a listing off all communication components, positions, configurations, and comparisons between the predicted performance results and the desired performance metrics for each boundary position within a computer dialog box. This dialog box, and example of which is given in FIG. 14, provides immense feedback to the user regarding the desirability of the different communication components, locations, and configurations. The user can quickly gauge which possible communication component models, locations, and configurations are optimal in order to meet the specified performance metrics defined at the position boundaries. As every column in the list 401 in FIG. 14 may be sorted, the designer can rapidly analyze the tradeoffs between the different choices in communication component model, location, and configuration in terms of the difference between the predicted performance metrics and the measured performance metrics at the boundary locations. The results may also be displayed graphically to the designer or exported into spreadsheet format for further analysis. This result is a major improvement over prior art as it enables a designer to easily determine optimal communication component types, positions, and configurations to meet the design constraints imposed upon the deployment of any communication system.

In function block 250, the designer may optionally select from the list of displayed results 401 shown in FIG. 14 and have the system automatically position a communication component of the selected model and/or type in the 3-D environmental model. The newly placed communication component has the position and configuration of the selected entry from the list 401 shown in FIG. 14. This functionality enables the communication system designer to allow the system to determine the optimal communication component placements within the 3-D environmental model to meet the imposed design goals, and then to automatically position communication components of the chosen model in the optimal position and configuration. If the method of FIGS. 11 or 12 was utilized, the selected communication components in function block 250 may optionally replace existing communication components in a previously modeled communication system within the 3-D environmental model of the facility. In addition, techniques described in H. D. Sherali, C. M. Pendyala, and T. S. Rappaport, "Optimal Location of Transmitters for Micro-Cellular Radio Communication System Design," IEEE Journal on Selected Areas in Communications, vol. 14, no. 4, May 1996, provide for automatic placement of communication equipment on the basis of calculated performance.

Figure 15:
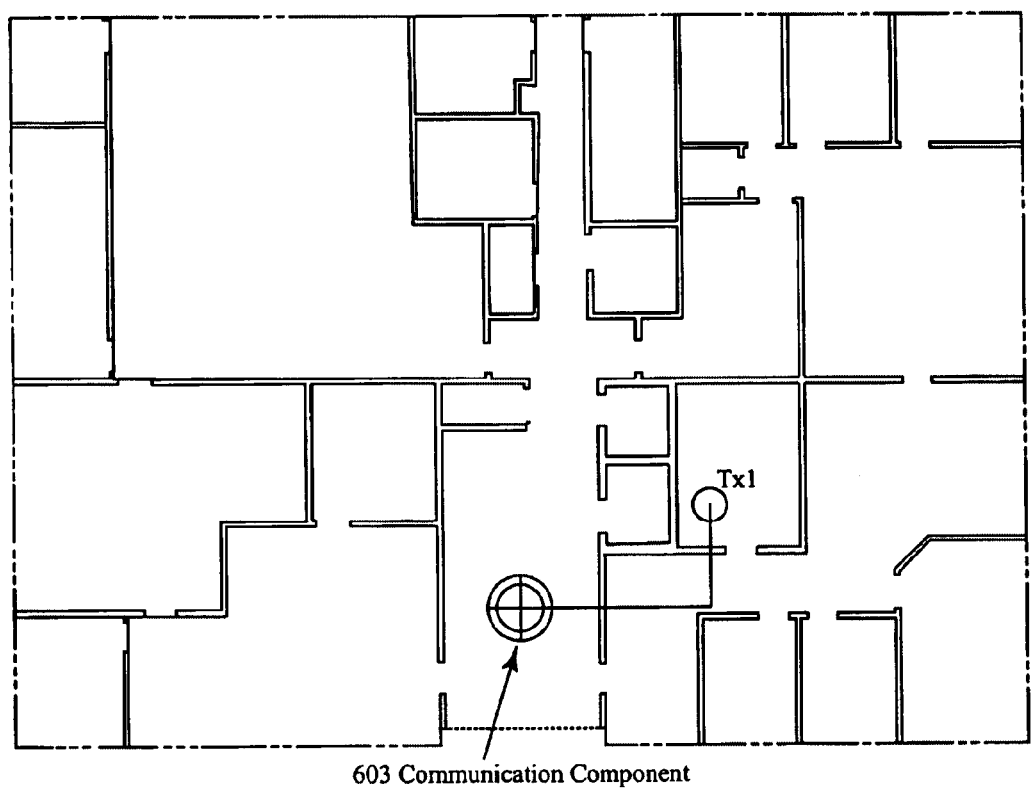
FIG. 15 is a schematic drawing of a floor plan according to this invention.

Referring now to FIG. 15, a simplified facility floor plan is shown. The same communication component system that was shown in FIG. 6 has been updated. The communication component 603 has been updated through the process described in function block 250 of FIG. 13 such that the communication component model, position, and/or configuration has been updated to reflect the optimal settings chosen by the system.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A site specific method for designing, deploying or optimizing a network, comprising the steps of:
   generating a computerized model of a space, said space having a plurality of different objects therein each of which may have attributes which impact performance of a communications network;
   establishing a desired performance metric for at least one selected location within said space;
   modeling performance attributes of a plurality of different components which may be used in said communications network;
   specifying components from said plurality of different components to be used in said communications network;
   specifying locations within said space for said specified components in said computerized model;
   predicting a predicted performance metric for said at least one selected location within said space based on said specified components and said specified locations; and
   comparing under computer control said predicted performance metric to said desired performance metric, wherein said steps of specifying components or specifying locations is performed automatically, by computer control, multiple times until a desired comparison result is obtained.

2. The method of claim 1 further comprising the step of specifying a configuration for said specified components.

3. The method of claim 2 wherein said step of specifying a configuration includes the step of defining an orientation of said specified component in said space at said specified location.

4. The method of claim 1 wherein at least some of said components specified in said specifying step are wireless communication components.

5. The method of claim 4 wherein at least some of the wireless communication components are antennas.

6. The method of claim 1 wherein said desired performance metric and said predicted performance metric are selected from the group consisting of received signal strength intensity, throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio, signal-to-noise ratio, physical equipment price, maintenance requirements, depreciation and installation cost.

7. The method of claim 1 wherein said computerized model of said space is three dimensional.

8. The method of claim 1 wherein said step of specifying locations is performed with a graphical interface.

9. The method of claim 1 wherein said step of specifying locations is performed by specifying location attributes for said specified components.

10. A site specific method for designing, deploying or optimizing a network, comprising the steps of:
generating a computerized model of a space, said space having a plurality of different objects therein each of which may have attributes which impact performance of a network;
establishing a desired performance metric for at least one selected location within said space;
modeling performance attributes of a plurality of different components which may be used in said network;
specifying components from said plurality of different components to be used in said network;
specifying locations within said space for said specified components in said computerized model;
predicting a predicted performance metric for said at least one selected location within said space based on said specified components and said specified locations; and
comparing under computer control said predicted performance metric to said desired performance metric, wherein said steps of specifying components or specifying locations is performed automatically, by computer control, multiple times until a desired comparison result is obtained.

11. The method of claim 10 further comprising the step of specifying a configuration for said specified components.

12. The method of claim 11 wherein said step of specifying a configuration includes the step of defining an orientation of said specified component in space at said specified location.

13. The method of claim 10 wherein at least some of said components specified in said specifying step are wireless communication components.

14. The method of claim 13 wherein at least some of the wireless communication components are from a category including antennas, transmitters, receivers and transceivers.

15. The method of claim 10 wherein said desired performance metric and said predicted performance metric are selected from the group consisting of received signal strength intensity, throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio, signal-to-noise ratio, hand off zones, traffic load, position location accuracy, physical equipment price, maintenance requirements, depreciation and installation cost.

16. The method of claim 10 wherein said computerized model of said space is three dimensional.

17. The method of claim 10 wherein said step of specifying locations is performed with a graphical interface.

18. The method of claim 10 wherein said step of specifying locations is performed by specifying location attributes for said specified components.

19. The method of claim 10 wherein said network is a wireless communications network.

20. A site specific apparatus for designing, deploying or optimizing a network, comprising:
a computerized model of a space, said space having a plurality of different objects therein each of which may have attributes which impact performance of a network;
device for establishing a desired performance metric for at least one selected location within said space;
computerized models of performance attributes of a plurality of different components which may be used in said network;
specifier specifying components from said plurality of different components to be used in said network;
specifier specifying locations within said space for said specified components in said computerized model;
predictor predicting a predicted performance metric for said at least one selected location within said space based on said specified components and said specified locations;
comparator comparing said predicted performance metric to said desired performance metric; and
specifier specifying under computer control a configuration for said selected components, and wherein one or more of said specifier specifying components, said specifier specifying locations, and said specifier specifying a configuration are performed automatically, by computer control, multiple times until a desired comparison result is obtained.

21. The apparatus of claim 20 wherein said specifier specifying a configuration defines an orientation of a specified component in said space at a selected location.

22. The apparatus of claim 20 wherein at least some of said components are wireless communication components.

23. The apparatus of claim 22 wherein at least some of the wireless communication components are from a category including antennas, transmitters, receivers and transceivers.

24. The apparatus of claim 20 wherein said desired performance metric and said predicted performance metric are selected from the group consisting of received signal strength intensity, throughput, bandwidth, quality of service, bit error rate, packet error rate, frame error rate, dropped packet rate, packet latency, round trip time, propagation delay, transmission delay, processing delay, queuing delay, capacity, packet jitter, bandwidth delay product, handoff delay time, signal-to-interference ratio, signal-to-noise ratio, hand off zones, traffic load, position location accuracy, physical equipment price, depreciation, maintenance requirements and installation cost.

25. The apparatus of claim 20 wherein said computerized model of said space is three dimensional.

26. The apparatus of claim 20 wherein said network includes wireless communication components.

27. The apparatus of claim 20 wherein said specifier specifying locations is performed with a graphical interface.

28. The apparatus of claim 20 wherein said specifier specifying locations specifies location attributes for said specified components.

29. A site specific system for modeling a communications network, comprising:

a display for displaying a site map of a site in which a communications network is or will be deployed;

a computer representation, rendered on said site map on said display, of a possible configuration of a communications network which includes a plurality of components which are or may be used in the communications network, one or more of said plurality of components having at least one of performance data, cost data, maintenance data, and equipments settings stored in a database;

device for establishing one or more parameters of a desirable configuration of said communications network;

device for changing at least one of
a) one or more components within said configuration of said communications network, and
b) equipment settings of one or more components within said configuration of said communications network;

device for determining predicted or measured parameters for said communications network for said site computer representation; and device for determining, under computer control, one or more optimized or preferred configurations of said communications network based on a comparison of predicted or measured parameters generated by said device for determining predicted or measured parameters and said one or more parameters of said desirable configuration established by said device for establishing, wherein said device for changing automatically, by computer control, changes in an iterative process a type of component or said one or more components.

30. The system of claim 29 wherein said device for determining predicted or measured parameters determines measured parameters for said communications network.

31. The system of claim 29 wherein said device for determining predicted or measured parameters determines predicted parameters for said communications network.

32. The system of claim 29 wherein one or more components of said plurality of components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, firewalls, MIMO systems, sensors, power distribution lines, wiring, twisted pair cabling and wireless or other access points.

33. The system of claim 29 wherein said one or more parameters of said desirable configuration are selected from radio signal strength intensity, connectivity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_c/I_o$, system performance parameters, equipment price, maintenance and cost information, user class or subclass, user type, position location, all in either absolute or relative terms.

34. A site specific system for modeling a communications network, comprising:

a display for displaying a site map of a site in which a communications network is or will be deployed;

a computer representation, rendered on said site map on said display, of a possible configuration of a communications network which includes a plurality of components which are or may be used in the communications network, one or more of said plurality of components having at least one of performance data, cost data, maintenance data, and equipment settings stored in a database;

device for establishing one or more parameters of a desirable configuration of said communications network;

device for changing at least one of
a) one or more components within said configuration of said communications network, and
b) equipment settings of one or more components within said configuration of said communications network;

device for determining predicted or measured parameters for said communications network for said site computer representation; and device for determining under computer control one or more optimized or preferred configurations of said communications network based on a comparison of predicted or measured parameters generated by said device for determining predicted or measured parameters and said one or more parameters of said desirable configuration established by said device for establishing, wherein said device for changing automatically, by computer control, changes in an iterative process a manufacturer of said one or more components.

35. A site specific system for modeling a communications network, comprising:

a display for displaying a site map of a site in which a communications network is or will be deployed;

a computer representation, rendered on said site map on said display, of a possible configuration of a communications network which includes a plurality of components which are or may be used in the communications network, one or more of said plurality of components having at least one of performance data, cost data, maintenance data, and equipment settings stored in a database;

device for establishing one or more parameters of a desirable configuration of said communications network;

device for changing at least one of
a) one or more components within said configuration of said communications network, and
b) equipment settings of one or more components within said configuration of said communications network;

device for determining predicted or measured parameters for said communications network for said site computer representation; and device for determining under computer control one or more optimized or preferred configurations of said communications network based on a comparison of predicted or measured parameters generated by said device for determining predicted or measured parameters and said one or more parameters of said desirable configuration established by said device for establishing, wherein said device for changing automatically, by computer control, changes in an iterative process a location of a component of said one or more components.

36. A site specific system for modeling a communications network, comprising:
a display for displaying a site map of a site in which a communications network is or will be deployed;
a computer representation, rendered on said site map on said display, of a possible configuration of a communications network which includes a plurality of components which are or may be used in the communications network, one or more of said plurality of components having at least one of performance data, cost data, maintenance data, and equipment settings stored in a database;
device for establishing one or more parameters of a desirable configuration of said communications network;
device for changing at least one of
a) one or more components within said configuration of said communications network, and
b) equipment settings of one or more components within said configuration of said communications network;
device for determining predicted or measured parameters for said communications network for said site computer representation; and
device for determining under computer control one or more optimized or preferred configurations of said communications network based on a comparison of predicted or measured parameters generated by said device for determining predicted or measured parameters and said one or more parameters of said desirable configuration established by said device for establishing, wherein said device for changing automatically, by computer control, changes in an iterative process one or more of transmit power, channel or frequency, bandwidth, data rate, antenna type, antenna configurations or positions, modulation or coding type, protocol, data rate, switching in a spare component, resetting, or changing settings of a component of said one or more components.

37. A site specific method for modeling a communications network, comprising:
displaying a site map of a site in which a communications network is or will be deployed;
configuring a computer representation on said site map on said display a possible configuration of a communications network which includes a plurality of components which are or may be used in the communications network, one or more of said plurality of components having at least one of performance data, cost data, maintenance data, and equipment settings stored in a database;
establishing one or more parameters of a desirable configuration of said communications network;
changing at least one of
a) one or more components within said configuration of said communications network, and
b) equipment settings of one or more components within said configuration of said communications network;
determining predicted or measured parameters for said communications network within said site generated by said configuring step and said changing step; and
determining under computer control one or more optimized or preferred configurations of said communications network based on a comparison of predicted or measured parameters generated by said determining predicted or measured parameters step and said one or more parameters of said desirable configuration established by said establishing step,
wherein said changing step automatically, by computer control, changes in an iterative process a type of component or said one or more components.

38. The method of claim 37 wherein said determining predicted or measured parameters step determines measured parameters for said communications network.

39. The method of claim 37 wherein said determining predicted or measured parameters step determines predicted parameters for said communications network.

40. The method of claim 37 wherein one or more components of said plurality of components are selected from the group consisting of base stations, base station controllers, amplifiers, attenuators, antennas, coaxial cabling, fiber optic cabling, splitters, repeaters, transducers, converters, couplers, leaky feeder cables, hubs, switches, routers, firewalls, MIMO systems, sensors, power distribution lines, wiring, twisted pair cabling and wireless or other access points.

41. The method of claim 37 wherein said one or more parameters of said desirable configuration are selected from radio signal strength intensity, connectivity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations, locations of adequate throughput, $E_c/I_o$, system performance parameters, equipment price, maintenance and cost information, user class or subclass, user type, position location, all in either absolute or relative terms.

42. A site specific method for modeling a communications network, comprising:
displaying a site map of a site in which a communications network is or will be deployed;
configuring a computer representation on said site map on said display a possible configuration of a communications network which includes a plurality of components which are or may be used in the communications network, one or more of said plurality of components having at least one of performance data, cost data, maintenance data, and equipment settings stored in a database;
establishing one or more parameters of a desirable configuration of said communications network;
changing at least one of
a) one or more components within said configuration of said communications network, and
b) equipment settings of one or more components within said configuration of said communications network;

determining predicted or measured parameters for said communications network for said site generated by said configuring step and said changing step; and determining under computer control one or more optimized or preferred configurations of said communications network based on a comparison of predicted or measured parameters generated by said determining predicted or measured parameters step and said one or more parameters of said desirable configuration established by said establishing step, wherein said changing step automatically, by computer control, changes in an iterative process a manufacturer of said one or more components.

43. A site specific method for modeling a communications network, comprising:

displaying a site map of a site in which a communications network is or will be deployed;

configuring a computer representation on said site map on said display a possible configuration of a communications network which includes a plurality of components which are or may be used in the communications network, one or more of said plurality of components having at least one of performance data, cost data, maintenance data, and equipment settings stored in a database;

establishing one or more parameters of a desirable configuration of said communications network;

changing at least one of a) one or more components within said configuration of said communications network, and b) equipment settings of one or more components within said configuration of said communications network;

determining predicted or measured parameters for said communications network for said site generated by said configuring step and said changing step; and determining under computer control one or more optimized or preferred configurations of said communications network based on a comparison of predicted or measured parameters generated by said determining predicted or measured parameters step and said one or more parameters of said desirable configuration established by said establishing step, wherein said changing step automatically, by computer control, changes in an iterative process a location of a component of said one or more components.

44. A site specific method for modeling a communications network, comprising:

displaying a site map of a site in which a communications network is or will be deployed;

configuring a computer representation on said site map on said display a possible configuration of a communications network which includes a plurality of components which are or may be used in the communications network, one or more of said plurality of components having at least one of performance data, cost data, maintenance data, and equipment settings stored in a database;

establishing one or more parameters of a desirable configuration of said communications network;

changing at least one of a) one or more components within said configuration of said communications network, and b) equipment settings of one or more components within said configuration of said communications network;

determining predicted or measured parameters for said communications network for said site generated by said configuring step and said changing step; and determining under computer control one or more optimized or preferred configurations of said communications network based on a comparison of predicted or measured parameters generated by said determining predicted or measured parameters step and said one or more parameters of said desirable configuration established by said establishing step, wherein said changing step automatically, by computer control, changes in an iterative process one or more of transmit power, channel or frequency, bandwidth, data rate, antenna type, antenna configurations or positions, modulation or coding type, protocol, data rate, switching in a spare component, resetting, or changing settings of a component of said one or more components.

* * * * *